(12) United States Patent
Kameyama et al.

(10) Patent No.: US 8,786,750 B2
(45) Date of Patent: Jul. 22, 2014

(54) IMAGING APPARATUS AND METHOD FOR CONTROLLING THE SAME

(75) Inventors: Makoto Kameyama, Yokohama (JP); Koji Yoshida, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 13/454,848

(22) Filed: Apr. 24, 2012

(65) Prior Publication Data

US 2012/0274830 A1    Nov. 1, 2012

(30) Foreign Application Priority Data

Apr. 28, 2011    (JP) .................................. 2011-101318

(51) Int. Cl.
*H04N 5/222* (2006.01)
(52) U.S. Cl.
USPC ............ 348/333.02; 348/333.05; 348/333.11; 348/333.12
(58) Field of Classification Search
USPC ............. 348/333.01, 333.02, 333.03, 333.04, 348/333.05, 333.11, 333.12
See application file for complete search history.

(56) References Cited

U.S. PATENT DOCUMENTS

| 2006/0098112 A1* | 5/2006 | Kelly ........................ 348/333.12 |
| 2009/0021594 A1* | 1/2009 | Tsuda et al. ................ 348/222.1 |
| 2013/0002709 A1* | 1/2013 | Yamagata ..................... 345/619 |

FOREIGN PATENT DOCUMENTS

| JP | 2003-125266 A | 4/2003 |
| JP | 2007-243923 A | 9/2007 |

* cited by examiner

*Primary Examiner* — Twyler Haskins
*Assistant Examiner* — Padma Haliyur
(74) *Attorney, Agent, or Firm* — Canon U.S.A., Inc. IP Division

(57) ABSTRACT

In a multiple-exposure imaging operation, an imaging apparatus performs an information display according to an appropriate display type considering imaging conditions. The imaging apparatus includes a display type setting unit configured to set any one of a plurality of display types as a display type for an information display to be displayed together with a through image, a mode setting unit to set a multiple-exposure imaging mode, perform a control, when the multiple-exposure imaging mode is set and an image to be multiple-composited with the through image can be acquired, to change to a display type dedicated to the multiple-exposure imaging mode for displaying at least one of the number of multiple-exposure image capturing scheduled images, the number of multiple-exposure image capturing completed images, the number of images remaining to reach the number of multiple-exposure image capturing scheduled images, and an icon indicating that the multiple-exposure imaging mode is set.

21 Claims, 19 Drawing Sheets

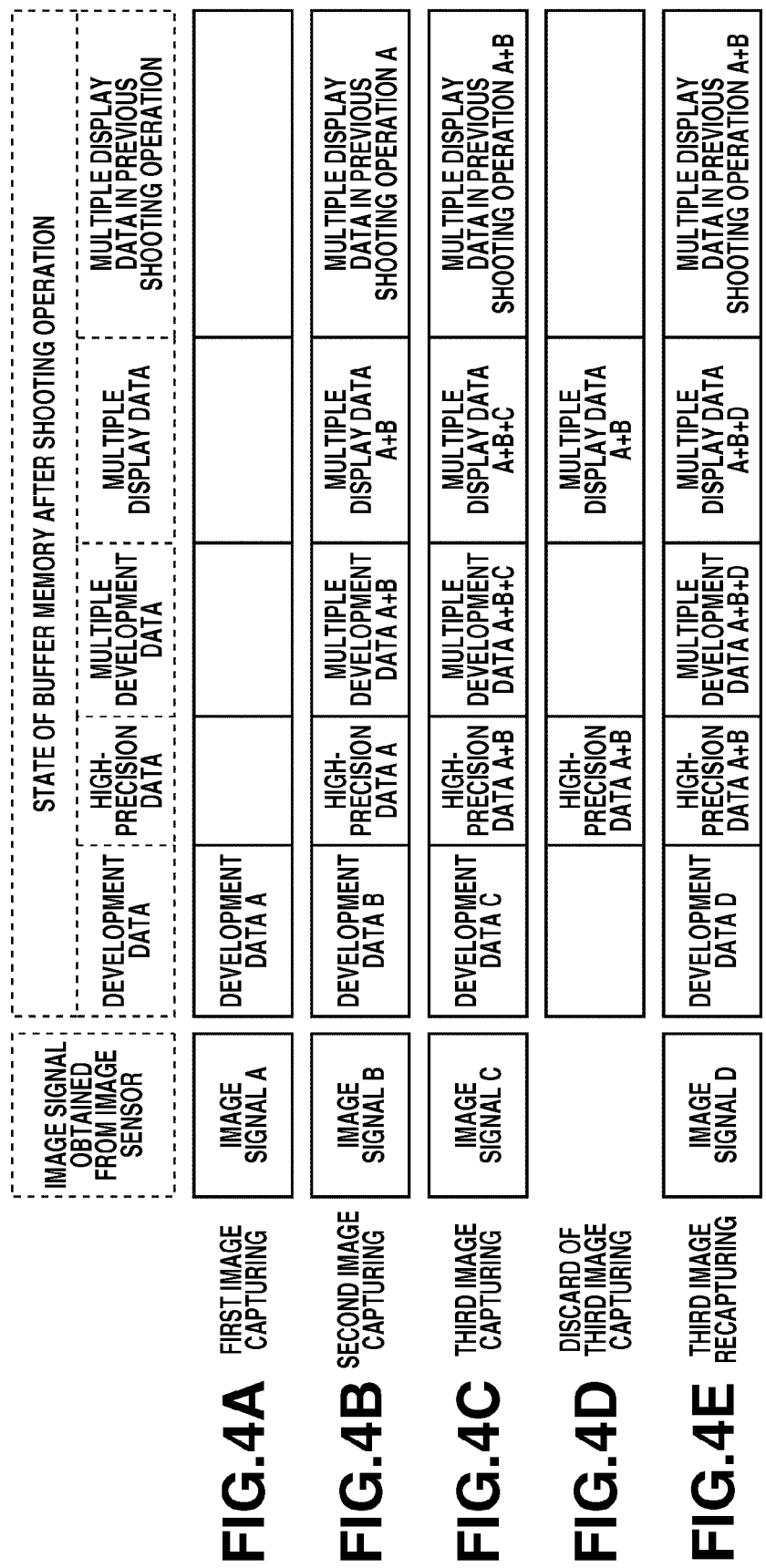

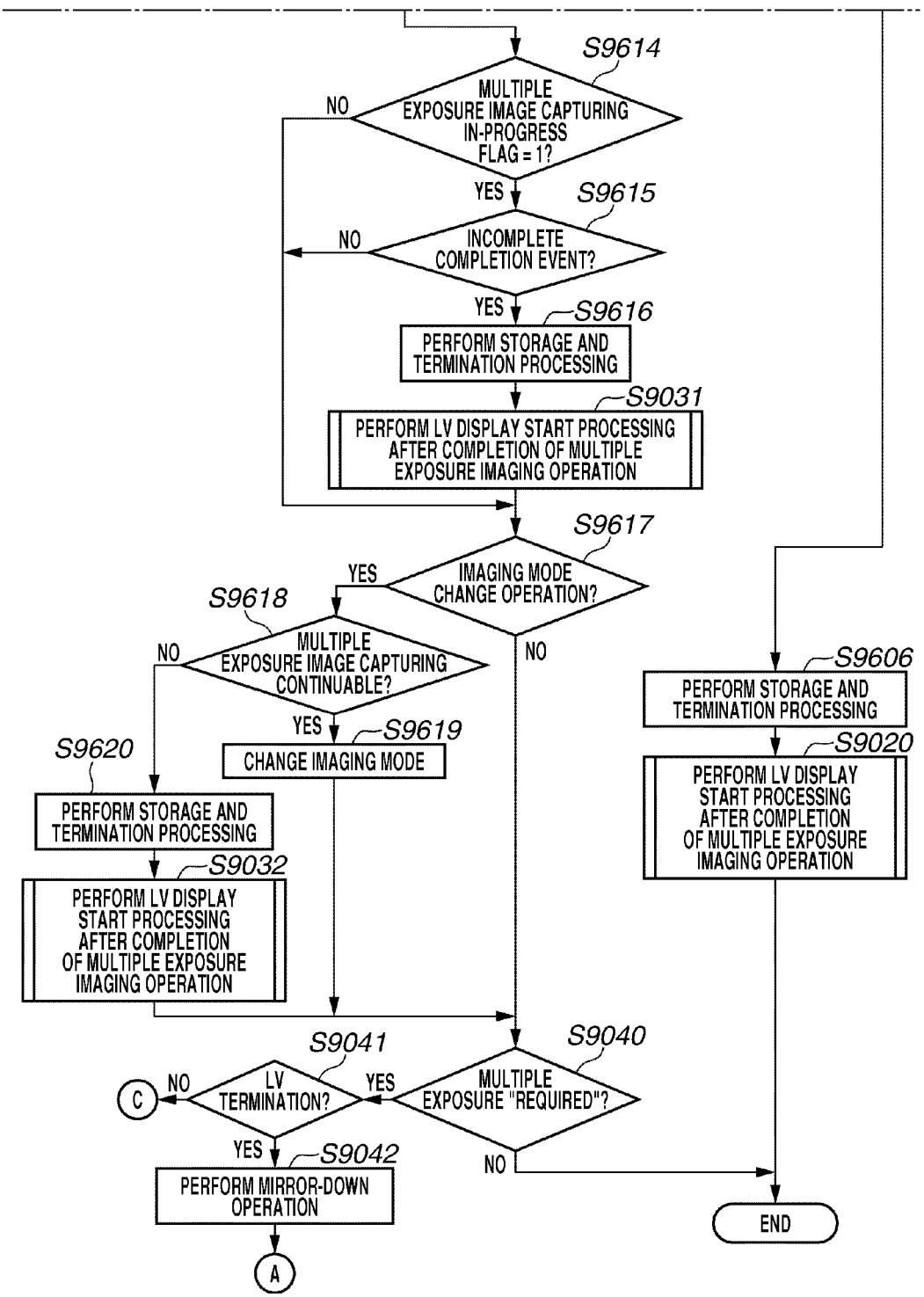

FIG.16
DISPLAY TYPE 1
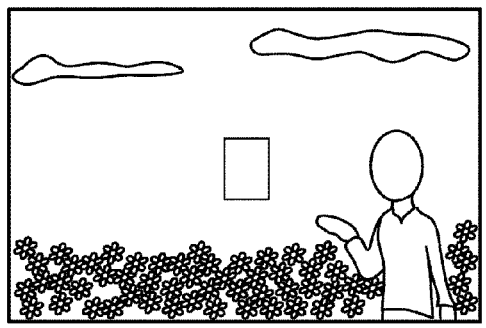
DISPLAY TYPE 4
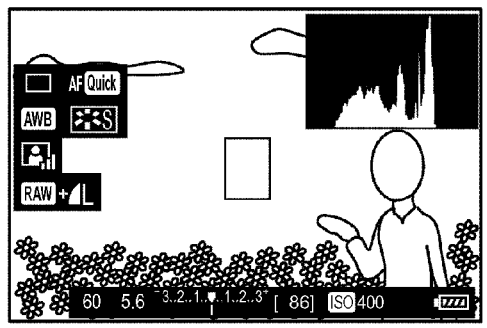
DISPLAY TYPE 2
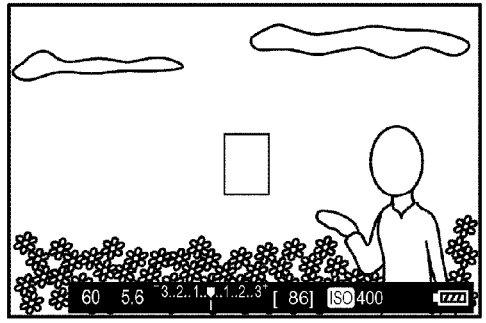
DISPLAY TYPE 5
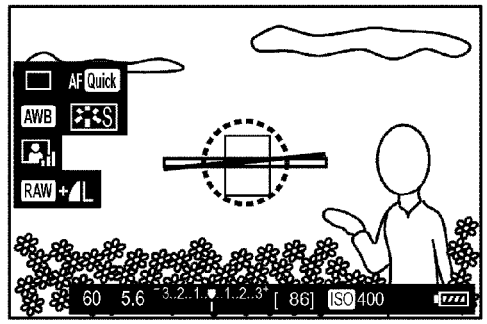
DISPLAY TYPE 3
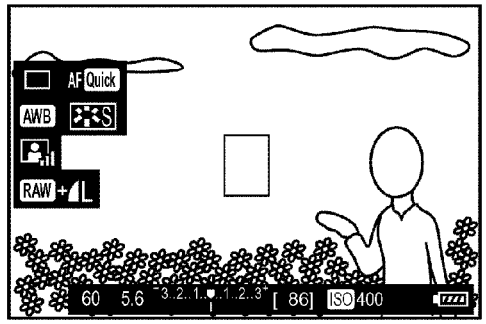
DISPLAY TYPE 6
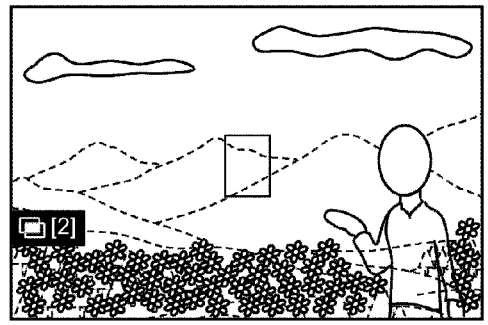

IMAGING APPARATUS AND METHOD FOR CONTROLLING THE SAME

BACKGROUND OF THE INVENTION

1. Field of the Invention

The present invention relates to an imaging apparatus. More specifically, the present invention relates to an imaging apparatus that is capable of multiple-compositing a plurality of captured images.

2. Description of the Related Art

It is conventionally feasible to perform multiple-exposure image capturing by adding a plurality of digital image signals. As discussed in Japanese Patent Application Laid-Open No. 2003-125266, it is conventionally feasible to display a multiple image obtainable by combining a previously captured image and a through image in a multiple imaging mode and enable a user to confirm the position of an object to be captured in the multiple image when an imaging apparatus performs multiple-exposure image capturing.

Further, there is a conventional digital camera that can display presently set imaging conditions and imaging assistant information in such a way as to superimpose the added information display on a through image to be displayed in an imaging standby state. As discussed in Japanese Patent Application Laid-Open No. 2007-243923, it is conventionally feasible to differentiate the information display to be superimposed on a through image according to a display mode and enable users to operate a single operation member to switch the display mode.

It is feasible to provide a display mode dedicated to the multiple imaging mode as one of the display modes for the information display discussed in Japanese Patent Application Laid-Open No. 2007-243923. Further, it is feasible to perform a display according to the display mode dedicated to the multiple imaging mode when a multiple image obtainable by combining a previously captured image with a through image is displayed as discussed in Japanese Patent Application Laid-Open No. 2003-125266. Further, if the display mode is automatically changed to the display mode dedicated to the multiple imaging mode in response to a mode switching to the multiple imaging mode, it is feasible to simplify the procedure for user operation.

However, a previously captured image to be superimposed on a through image is not present if a capturing of the first image is not completed after starting the multiple imaging mode operation. Thus, it is not feasible to display a multiple image obtainable by combining a through image with other image. Accordingly, even when the multiple imaging mode is set, setting the display mode dedicated to the multiple imaging mode may not be desired if the capturing of the first image is not completed. Further, it is desired to switch the display mode dedicated to the multiple imaging mode to other display mode upon termination of the multiple imaging mode operation.

SUMMARY OF THE INVENTION

The present invention is directed to an imaging apparatus capable of realizing an information display using a preferable display type with reference to an imaging status in a multiple-exposure imaging operation.

According to an aspect of the present invention, an imaging apparatus includes an imaging unit configured to capture a through image, a display type setting unit configured to set any one of a plurality of display types as a display type for an information display to be displayed together with the through image captured by the imaging unit, and a mode setting unit configured to set a multiple-exposure imaging mode. Further, the imaging apparatus includes a control unit configured to perform a control when the multiple-exposure imaging mode is set by the mode setting unit and an image to be multiple-composited with the through image can be acquired in such a way as to change the display type to a display type dedicated to the multiple-exposure imaging mode for displaying at least one of the number of multiple-exposure image capturing scheduled images, the number of multiple-exposure image capturing completed images, the number of images remaining to reach the number of multiple-exposure image capturing scheduled images, and an icon indicating that the multiple-exposure imaging mode is set.

According to the present invention, it is feasible to realize the information display using a preferable display type with reference to an imaging status in the multiple-exposure imaging operation.

This summary of the invention does not necessarily describe all necessary features so that the invention may also be a sub-combination of these described features.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A to 4E illustrate image data stored in a buffer memory 122 during a multiple-exposure imaging operation according to an exemplary embodiment of the present invention.

FIG. 16 illustrates display examples of a plurality of display types.

DESCRIPTION OF THE EMBODIMENTS

Various exemplary embodiments, features, and aspects of the invention will be described in detail below with reference to the drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

Figure 1:
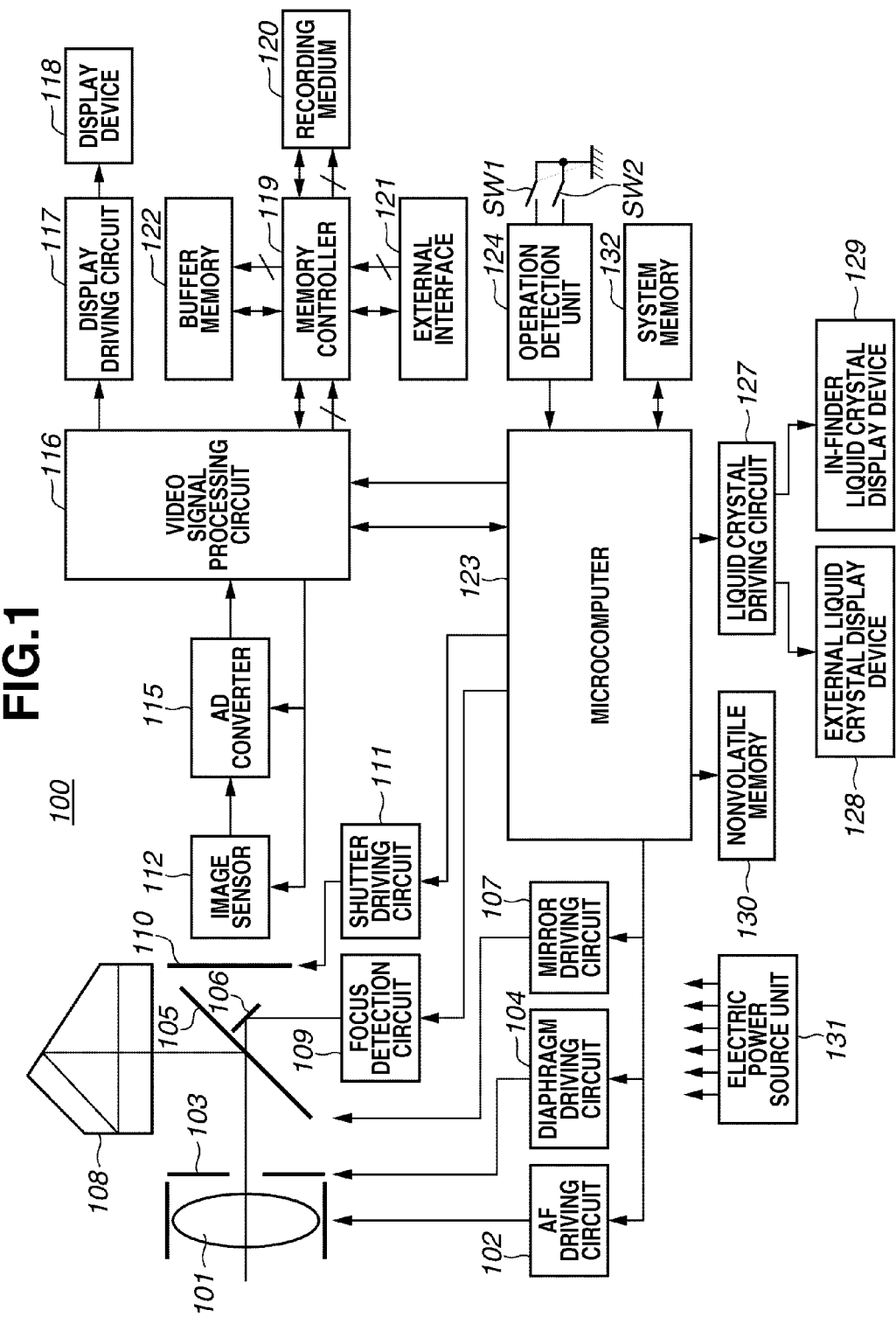
FIG. 1 is a block diagram illustrating an example configuration of a digital camera 100 according to an exemplary embodiment of the present invention.

FIG. 1 is a block diagram illustrating an example configuration of a digital camera 100 that is operable as an imaging apparatus according to an exemplary embodiment of the present invention.

In FIG. 1, an imaging lens 101 is an interchangeable lens that includes a zoom lens and a focus lens. The imaging lens 101 is attachable to and detachable from the body of the digital camera 100.

An automatic focus (AF) driving circuit 102 includes, for example, a direct-current (DC) motor or a stepping motor. The AF driving circuit 102 changes the position of the focus lens included in the imaging lens 101, to adjust the focus point, based on a control signal supplied from a microcomputer 123.

A diaphragm driving circuit 104 drives a diaphragm 103 to adjust the quantity of light that reaches an image sensor 112. The diaphragm driving circuit 104 changes an optical diaphragm value based on a driving amount calculated by the microcomputer 123.

A main mirror 105 is a mirror that is capable of guiding the light flux having passed through the imaging lens 101 toward a finder or the image sensor 112. More specifically, in an ordinary state, the main mirror 105 is positioned in such a way as to reflect (i.e., guide) the light flux toward the finder. On the other hand, when an imaging operation is performed or when a live view display operation is performed, the main mirror 105 is moved to a mirror-up position so that the light flux can be directly guided toward the image sensor 112 without being reflected by the main mirror 105. Further, the main mirror 105 has a central portion configured as a half mirror so that a part of the light can pass through the main mirror 105 and reach a sensor that can perform focus detection.

A sub mirror 106 is a mirror that can reflect the light flux having passed through the main mirror 105 toward the sensor that can perform focus detection (i.e., a sensor disposed in a focus detection circuit 109).

A mirror driving circuit 107 can drive the main mirror 105 based on a control signal supplied from the microcomputer 123.

A pentagonal prism 108 constitutes a part of the finder. The finder includes a focus plate and an eyepiece lens (not illustrated) in addition to the pentagonal prism 108.

The focus detection circuit 109 is a circuit block that can perform focus detection. The light flux having passed through the central portion of the main mirror 105 is reflected by the sub mirror 106 and reaches the sensor disposed in the focus detection circuit 109 that performs photoelectric conversion. The defocus amount required in focus calculation can be obtained by calculating an output of the sensor. The microcomputer 123 evaluates a calculation result and instructs the AF driving circuit 102 to drive the focus lens.

A shutter driving circuit 111 can drive a focal plane shutter 110. The shutter driving circuit 111 adjusts an aperture time of the shutter based on a control signal supplied from the microcomputer 123.

The image sensor 112 is a Charge Coupled Device (CCD) sensor or a Complementary Metal Oxide Semiconductor (CMOS) sensor. The image sensor 112 can convert an object image formed by the imaging lens 101 into an electric signal.

An analog to digital (AD) converter 115 can convert an analog signal output from the image sensor 112 into a digital signal.

A video signal processing circuit 116 can be realized by a logic device, such as a gate array, to perform various video signal processing.

A display driving circuit 117 is a driving circuit that causes a display device 118 to realize an intended display. The display device 118 is, for example, a thin film transistor (TFT) liquid crystal display or an organic electroluminescence (EL) display. In the exemplary embodiment, the display device 118 is a back monitor of the digital camera 100.

A memory controller 119 can receive unprocessed digital image data from the video signal processing circuit 116 and store the received image data in a buffer memory 122. The memory controller 119 can store processed digital image data in a recording medium 120. On the other hand, the memory controller 119 can output image data stored in the buffer memory 122 or the recording medium 120 to the video signal processing circuit 116. Further, the memory controller 119 can output image data stored in the recording medium 120 via an external interface 121 that is connectable with a computer.

The recording medium 120 is a detachable recording medium, such as a memory card. Alternatively, the recording medium 120 can be a built-in recording medium of the digital camera or can be a plurality of recording media.

The external interface 121 is an interface that can communicate with an external device, such as a computer, via a wired or wireless communication device. The buffer memory 122 is a memory that can temporarily store image data. For example, various image data to be used during a multiple-exposure imaging operation can be stored.

The video signal processing circuit 116 can perform filter processing, color conversion processing, and gamma processing on a digitalized image signal to generate development data. Further, the video signal processing circuit 116 can perform JPEG compression processing and output the compressed data to the memory controller 119.

The video signal processing circuit 116 can add two or more development data stored in the buffer memory 122, or can generate high-precision data (i.e., data having a higher bit gradation derived from the development data). Further, the video signal processing circuit 116 can perform the above-described processing simultaneously, and can return a processed result to the buffer memory 122. Further, the video signal processing circuit 116 can output a video signal obtained by the image sensor 112 and an image signal received from the memory controller 119 to the display device 118 via the display driving circuit 117.

The switching of the above-described functions can be performed in response to an instruction signal supplied from the microcomputer 123. The video signal processing circuit 116 can output exposure information and white balance information of the signal obtained from the image sensor 112, if necessary, to the microcomputer 123. The microcomputer 123 can instruct white balance and gain adjustment based on the obtained information.

In a continuous imaging operation, the video signal processing circuit 116 stores imaging data temporarily, as unprocessed image, in the buffer memory 122 and reads unprocessed image data via the memory controller 119. The video signal processing circuit 116 performs image processing and compression processing on the unprocessed image data to perform a continuous imaging operation. The number of images that can be captured during the continuous imaging operation is variable depending on the remaining capacity of the buffer memory 122.

The microcomputer 123 is a main control unit that can control various operations to be performed by the digital camera 100. The microcomputer 123 uses the system memory 132 as a work memory and executes various programs stored in a nonvolatile memory 130.

An operation detection unit 124 can detect an operational state of each operation member and transmit the detected operational state of the operation member to the microcomputer 123. The microcomputer 123 can control each unit according to a change amount of the operation member. In the present exemplary embodiment, the operation detection unit 124 can detect an opened/closed state of a card cover 28 (i.e., a cover of a slot where the recording medium 120 is placed) or a battery cover 29.

A switch 1 (hereinafter, referred to as "SW1") is a switch that turns on in response to a half-press motion of a release button 10 (i.e., one of a plurality of operation members). When the switch SW1 is turned on, the microcomputer 123 performs imaging preparation processing that includes an automatic focus (AF) operation and a light metering operation.

A switch 2 (hereinafter, referred to as "SW2") is a switch that turns on in response to a full-press motion of the release button 10. When the switch SW2 is turned on, the microcomputer 123 performs main imaging processing that includes imaging an object and recording a captured image as an image file in the recording medium 120. Further, if both the SW1 and the SW2 are turned on continuously, the microcomputer 123 continues to perform the imaging operation.

A liquid crystal driving circuit 127 can drive a liquid crystal display device, such as an external liquid crystal display device 128 and an in-finder liquid crystal display device 129, according to a display content command supplied from the microcomputer 123. The liquid crystal display devices 128 and 129 can display an operational state and/or a message using characters and image(s). The in-finder liquid crystal display device 129 is equipped with a light-emitting diode (LED) (not illustrated) that is capable of emitting backlight. The liquid crystal driving circuit 127 can drive the LED.

The microcomputer 123 can confirm the remaining capacity of the recording medium 120 and calculate the number of remaining images that can be captured, via the memory controller 119, based on estimated image size data that can be obtained with reference to ISO sensitivity, image size, and image quality having been set beforehand. If necessary, the number of remaining capturable images can be displayed on the display device 118, the external liquid crystal display device 128, and the in-finder liquid crystal display device 129.

The nonvolatile memory 130 is, for example, an Electrically Erasable Programmable Read-Only Memory (EEPROM) or a flash memory, which can hold data constantly even in a state where no electric power is supplied to the camera. An electric power source unit 131 can supply a required amount of electric power to each block or a driving system.

Figure 2A:
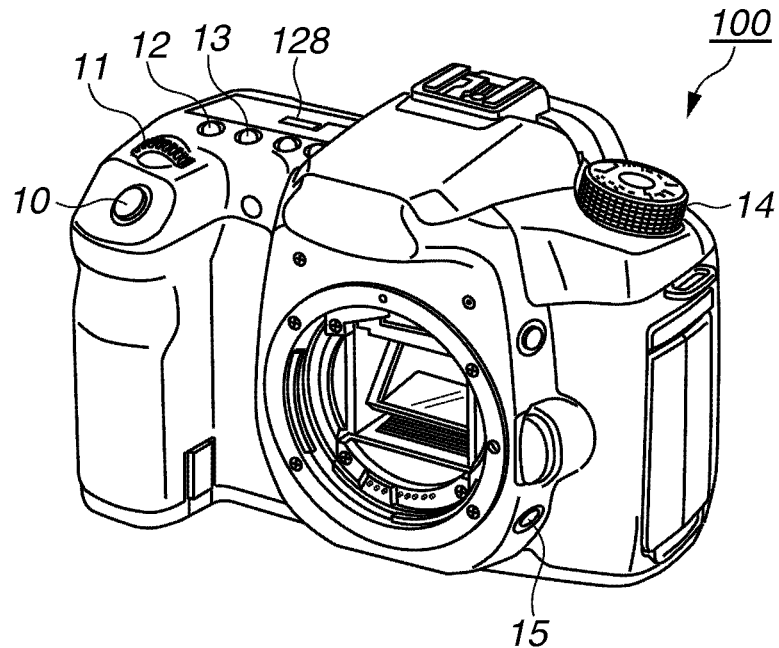
FIGS. 2A and 2B illustrate an appearance of the digital camera 100 according to an exemplary embodiment of the present invention.
Figure 2B:
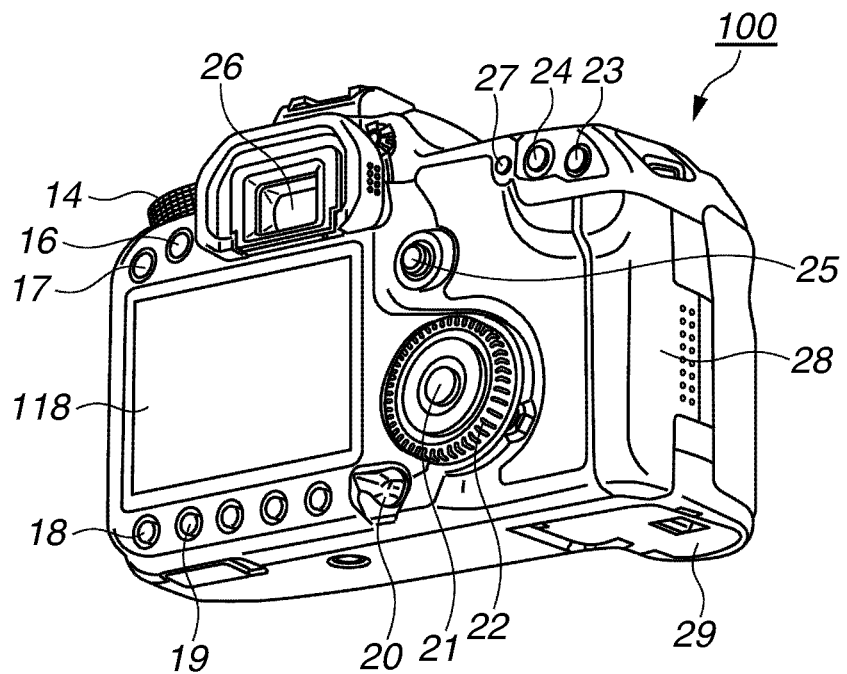

FIGS. 2A and 2B illustrate an appearance of the digital camera 100. FIG. 2A is a front perspective view of the digital camera 100. FIG. 2B is a back perspective view of the digital camera 100. In the state of the front perspective view illustrated in FIG. 2A, the imaging lens 101 (i.e., an interchangeable lens) is not attached to the camera body.

As illustrated in FIG. 2A, the digital camera 100 includes a main electronic dial 11, an ISO setting button 12, an exposure correction button 13, a imaging mode dial 14, and a preview button 15, as operation members, in addition to the release button 10.

The preview button 15 is a button that can reduce the aperture of the diaphragm to have a preset stop (F value). If the preview button 15 is pressed during the live view display operation in an imaging mode, a user can confirm the brightness of an image to be captured at the preset aperture.

The live view display is a real-time display of through images that can be continuously captured by the image sensor 112 in a state where the main mirror 105 is held at a retracted position, so that the display device 118 is functionally operable as an electronic viewfinder.

In the live view display operation, the AD converter 115 receives a captured image from the image sensor 112 and converts the captured image into a digital signal. The video signal processing circuit 116 develops a received digital signal to generate a through image. Then, the display driving circuit 117 displays a through image or a multiple composite image (i.e., a composite image obtainable by combining a through image and a previously captured image) on the display device 118.

The image to be displayed on the display device 118 is successively updated so that the displayed images can be visually recognized as a moving image. For example, if the above-described update processing is repeated 30 times per second, the live view display can be realized at a frame rate of 30 fps.

The main electronic dial 11 is a rotational operation member, which can be used to change (increase/reduce) setting values of predetermined imaging conditions or change an item to be selected, or to switch a set of images in a reproduction mode.

As illustrated in FIG. 2B, the digital camera 100 includes a plurality of operation members, such as an information display button 16, a menu button 17, a reproduction button 18, a deletion button 19, a main SW 20, and a set button 21. Further, the digital camera 100 includes additional operation members, such as a sub electronic dial 22, an enlargement button 23, a size reduction button 24, and a multi-controller 25. The main SW 20 is an operation member usable to turn on and off the electric power source of the digital camera 100.

The sub electronic dial 22 is a rotational operation member, which is usable to change an item to be selected or to successively feed images to be displayed in the reproduction mode.

A finder eyepiece portion 26 is an eyepiece portion where a user can view an optical image through the finder. A live view button 27 is a button that can receive a user's instruction to start the live view display operation. The live view button 27 can be pressed to switch the live view display from ON to OFF or vice versa. The card cover 28 is a cover of a storing portion where the recording medium 120 can be accommodated. The battery cover 29 is a cover of a storing portion where a battery that serves as the electric power source unit 131 is stored.

The digital camera 100 can realize a multiple-exposure imaging operation by adding a plurality of digital image signals. The digital camera 100 starts the multiple-exposure imaging operation in response to a multiple-exposure imaging mode setting. More specifically, as described in detail below with reference to FIGS. 3A and 3B, a user can select a setting option that the multiple-exposure image capturing is "required" on a menu screen to set the multiple-exposure imaging mode.

The digital camera 100 generates a multiple-composited image by adding (hereinafter, referred to as "multiple" or "multiple-compositing") a plurality of images captured after the multiple-exposure imaging mode is set. The digital camera 100 records the multiple-composited image as an image file in the recording medium 120. One of two methods "addition mode" and "automatic exposure adjustment mode" can be arbitrarily used, as an example method for the addition processing, to generate a multiple-composited image to be recorded in the recording medium 120.

According to the addition mode, the following formula (1) is used to obtain a summed-up compositing rate by simply adding luminance values of a plurality of images to be added. The digital camera 100 performs the addition processing based on the calculated compositing rate. If an addition result according to the formula (1) exceeds a recordable maximum luminance, the calculated value is replaced by the recordable maximum luminance (i.e., an upper-limit value indicating a saturated state). According to the automatic exposure adjustment mode, the following formula (2) is used to obtain an averaged compositing rate by calculating an average luminance value of the images to be added. The digital camera 100 performs the addition processing based on the calculated compositing rate to generate a multiple-composited image having the averaged luminance.

$$Yn = y1 + y2 + \ldots + yn-1 + yn \quad (1)$$

$$Yn = (y1 + y2 + \ldots + yn-1 + yn)/n \quad (2)$$

Yn: luminance value of a multiple-composited image generated by multiple-compositing a total of n images
y1: luminance value of the first image
y2: luminance value of the second image
yn−1: luminance value of the (n−1)th image
yn: luminance value of the n-th image
n: the number of images to be added It is feasible to perform the multiple-compositing based on the following formulae (3) and (4), which are converted from the formulae (1) and (2) respectively. In this case, an image having been already subjected to the multiple-compositing for the one processed immediately before is used. More specifically, in a case where the automatic exposure adjustment function setting is "not required" (i.e., in the case of the addition mode), the digital camera 100 performs multiple-compositing through the addition processing defined by the following formula (3) in such a way as to set the compositing rate calculated according to the above-described formula (1). In a case where the automatic exposure adjustment function setting is "required" (i.e., in the case of the automatic exposure adjustment mode), the digital camera 100 performs multiple-compositing through the addition processing defined by the following formula (4) in such a way as to set the compositing rate calculated according to the above-described formula (2).

$$Yn = Yn-1 + yn \quad (3)$$

$$Yn = \{Yn-1 \times (n-1)/n\} + \{yn \times 1/n\} \quad (4)$$

Yn: luminance value of a multiple-composited image generated by multiple-compositing a total of n images
Yn−1: luminance value of a multiple-composited image generated by multiple-compositing a total of (n−1) images
yn: luminance value of the n-th image
n: the number of images to be added If the digital camera 100 starts the live view display in the multiple-exposure imaging mode, the digital camera 100 displays a composite image that can be obtained by multiple-compositing a base image (in a case where the base image setting is "required"), a previously captured image that is already captured after starting the multiple-exposure imaging mode operation, and a through image. In the present exemplary embodiment, the base image is an image selected from the images recorded in the recording medium 120 before setting the multiple-exposure imaging mode. Further, the base image is an image to be combined with an image to be captured in a subsequent multiple-exposure imaging operation.

Thus, a user can perform an imaging operation while confirming how the image to be captured in the next imaging operation is multiple-composited. However, in the live view display operation, if the addition processing is performed using a compositing rate similar to that used in a case where a multiple-composited image to be recorded in the recording medium 120 is generated as described with reference to the formula (1) or the formula (2), a user may not view a through image clearly. In this case, the user cannot surely adjust the composition of an image to be captured next while viewing a through image.

For example, in the addition mode, if the luminance value of a bright portion is added, the total luminance value may be saturated (i.e., reaches a maximum luminance value). In this case, it is difficult to confirm the composition or the in-focus state.

In the automatic exposure adjustment mode, the luminance values of the captured images are averaged. Therefore, for example, if the number of images having been already captured increases after starting the multiple-exposure imaging mode operation, the luminance value per image becomes lower and the luminance value of each through image becomes lower. Accordingly, it is difficult to confirm the composition or the in-focus state.

Therefore, in a case where a through image and a previously captured image are multiple-composited and an obtained composite image is displayed to realize the live view display in the multiple-exposure imaging mode, the digital camera 100 according to the present invention ordinarily sets a compositing rate of a through image to be higher than that of the previously captured image to be combined.

When the compositing rate of the through image is increased relatively as described above, the digital camera 100 can clearly display the through image compared to the previously captured image in such a way as to enhance the visibility of the through image. Further, maintaining the compositing rate of the through image at a constant level regardless of the number of previously captured images to be combined is useful to enhance the visibility of the through image. More specifically, when the digital camera 100 performs the multiple-compositing for the live view display, the digital camera 100 sets a compositing rate according to the following formula (5).

$$Yl = \{Yn \times (1-M)\} + \{yt \times M\} \quad (5)$$

Yl: luminance value of a multiple-composited image to be displayed in the live view display operation
yt: luminance value of the through image
Yn: luminance value of a composite image generated by multiple-compositing a total of n images having been acquired at that moment, i.e., luminance value of previously captured images to be combined with the through image
M: compositing rate of the through image in the multiple-composited image to be displayed in the live view display operation In the above-described formula (5), M is equal to or greater than 0.5 and less than 1. More specifically, the luminance compositing rate of the through image is set to be equal to or higher than the luminance compositing rate of the previously captured images to be combined. Further, it is useful to set the luminance compositing rate of the through image to be higher than that of each of the previously captured image to be combined.

Further, the live view display can be realized by setting an exclusive display of the through image that does not require the multiple-compositing. In this case, only the through image can be displayed if M is set to 1 (i.e., M=1) in the formula (5) because the compositing rate (1−M) for the luminance Yn of the previously captured image becomes 0. When the digital camera 100 displays the through image exclusively, each user can easily confirm the present in-focus state of the through image.

Generating a multiple-composited image using the formula (5) is useful to improve the visibility of a through image when the composite image is displayed in the live view display operation. However, the multiple-composited image is an image having a compositing rate that is different from the compositing rate of a multiple-composited image to be generated based on the formula (1) or (3), or the formula (2) or (4), and recorded in the recording medium 120 after a main imaging operation is actually performed. Accordingly, it is difficult to confirm details (e.g., luminance balance and density) of a multiple-composited image actually recorded in the recording medium 120. Thus, the multiple-composited image generated using the formula (5) cannot be taken into consideration in setting imaging conditions (including the exposure).

Hence, if the preview button 15 is pressed during the live view display operation in the multiple-exposure imaging mode, the digital camera 100 performs a display in such a way as to allow a user to preliminarily confirm a simulated multiple-composited image to be generated when a main imaging operation is performed. The display performed in this case is referred to as a "simulated live view display."

The digital camera 100 composites a multiple-composited image to be displayed in the simulated live view display according to the automatic exposure adjustment function setting. More specifically, if the automatic exposure adjustment function is "not required" (i.e., when the selected mode is the addition mode), the digital camera 100 refers to the following formula (6). If the automatic exposure adjustment function is "required" (i.e., when the selected mode is the automatic exposure adjustment mode), the digital camera 100 refers to the following formula (7).

$$Ys = Yn + yt \quad (6)$$

$$Ys = \{Yn \times n/(n+1)\} + \{yt \times 1/(n+1)\} \quad (7)$$

Ys: luminance value of a multiple-composited image to be displayed in the simulated live view display
yt: luminance value of a through image
Yn: luminance value of an image generated by multiple-compositing a total of n images that are already acquired at that moment, i.e., luminance value of an already captured image to be combined with a through image.
n: number of images already acquired at that moment, i.e., number of images having been captured at present time in one-set multiple-exposure imaging operation in a case where no base image is set, or number of images having been captures at present time+1 in one-set multiple-exposure imaging operation if a base image is present.

The luminance compositing rate of the previously captured image Yn in the formula (6) or the formula (7) is equal to the compositing rate for a multiple-composited image Yn+1 to be generated when one more image is captured and recorded in the recording medium.

It is useful to perform the multiple-compositing processing based on the above-described formulae (1) to (7) for each color.

A multiple-exposure imaging operation in which the digital camera 100 performs the multiple-compositing processing at the above-described compositing rate is described in detail below.

A method for setting preliminary setting items that relate to the multiple-exposure imaging operation is described below.

Figure 3A:
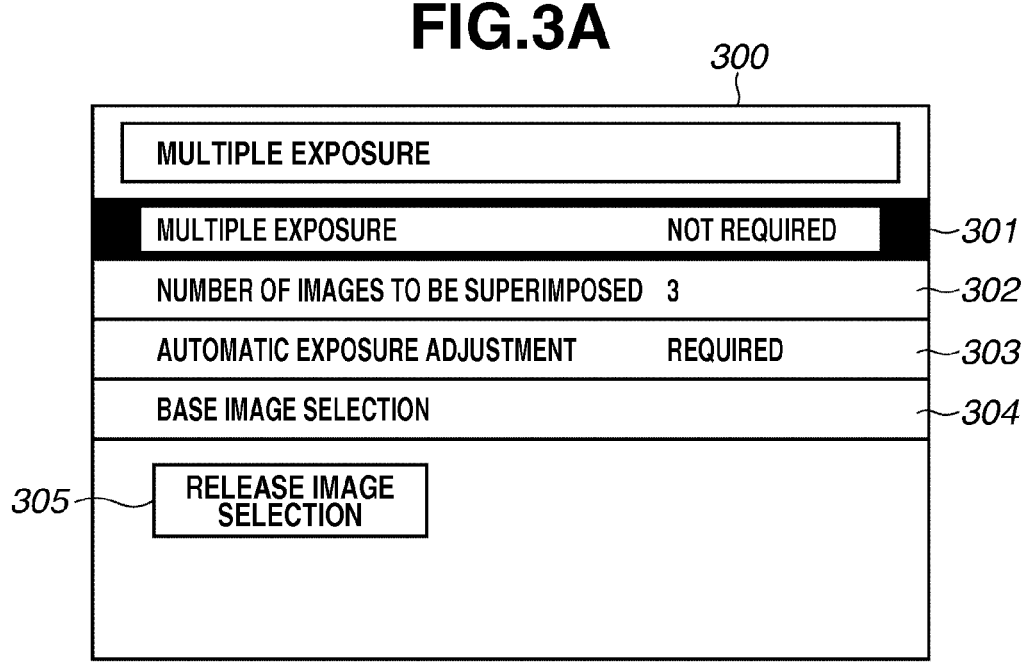
FIGS. 3A and 3B illustrate examples of a preliminary setting menu screen that relates to a multiple-exposure imaging operation according to an exemplary embodiment of the present invention.
Figure 3B:
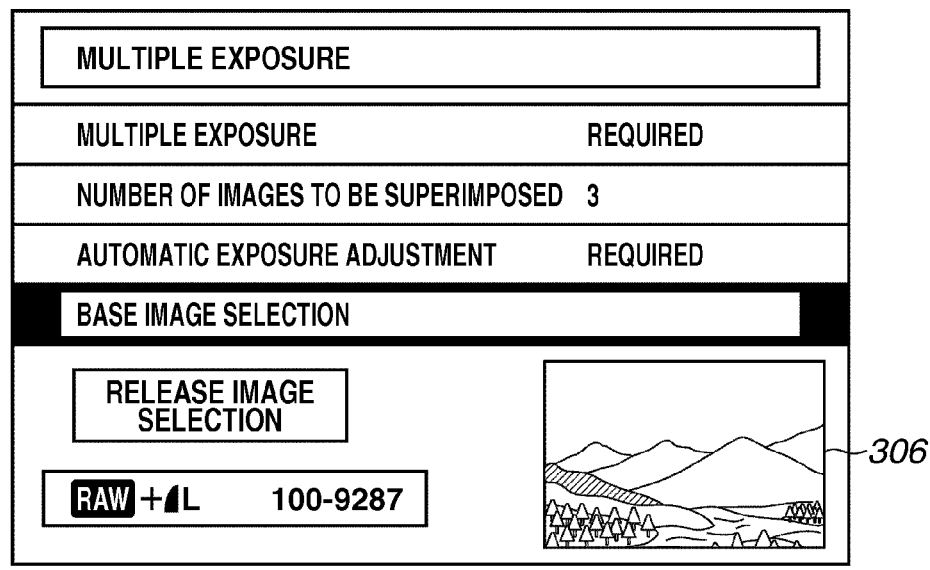

FIGS. 3A and 3B illustrate display examples of a menu screen that allows a user to perform settings for the digital camera 100, which relate to the multiple-exposure imaging operation. FIG. 3A illustrates a menu screen 300 that relates to the multiple-exposure imaging operation. If a user presses the menu button 17 to display the main menu and selects a multiple-exposure image capturing related menu from the main menu, the multiple-exposure image capturing related menu can be displayed on the display device 118.

The menu screen 300 illustrated in FIG. 3A includes a plurality of menu items 301 to 304. Each user can operate the sub electronic dial 22 to select an arbitrary menu item (i.e., one of the menu items 301 to 304).

If the user presses the set button 21 in a state where any one of the menu items is selected, a setting candidate list that relates to the selected menu item can be displayed. Further, if the user operates the sub electronic dial 22 to select a desired setting candidate from the displayed setting candidate list and presses the set button 21 again, the selected setting candidate can be set as a finalized setting value.

The menu item 301 is a menu item that allows users to determine whether to perform the multiple-exposure image capturing. There are two setting candidates, e.g., "required" and "not required", one of which is settable for the menu item 301. Hereinafter, the setting content of the menu item 301 is referred to as "multiple-exposure image capturing necessity setting." The multiple-exposure image capturing necessity setting can be stored in the system memory 132 or in the nonvolatile memory 130.

If the multiple-exposure image capturing necessity setting changes from "not required" to "required" according to a user operation, the operational mode is changed to the multiple-exposure imaging mode. The digital camera 100 starts a multiple-exposure imaging operation for the next and subsequent images to be captured. Then, the multiple-exposure image capturing necessity setting returns from "required" to "not required" automatically if the number of images captured through the multiple-exposure imaging operation reaches a predetermined value, or when some conditions are satisfied simultaneously (as described below). If the multiple-exposure image capturing necessity setting changes from "required" to "not required" in response to a user operation in a state where the multiple-exposure imaging operation is not completed yet, the digital camera 100 terminates the multiple-exposure imaging operation immediately. In this case, if a multiple-composited image file is generable, the digital camera 100 generates the multiple-composited image file based on a control signal supplied from the microcomputer 123.

The menu item 302 is a menu item that allows users to select the number of images to be combined in a one-set multiple-exposure imaging operation. Any one of setting candidates "2" to "9" is settable as the number of images.

In a case where the base image is not selected, the number of images in the menu item 302 is equal to the number of multiple-exposure image capturing scheduled images. If a base image is selected, the number of multiple-exposure image capturing scheduled images is smaller than the number of images in the menu item 302 by one. The number of multiple-exposure image capturing scheduled images can be stored in the system memory 132.

The menu item 302 cannot be selectively changed after one or more images have been captured in the multiple-exposure image capturing if the multiple-exposure image capturing is not yet completed (hereinafter, referred to as a state where "the multiple-exposure imaging operation is in progress", i.e., a state where a multiple-exposure image capturing in-progress flag is equal to 1).

The menu item 303 is a menu item that allows users to determine the necessity to execute the automatic exposure adjustment function in the multiple-exposure image capturing. There are two setting candidates, e.g., "required" and "not required", one of which is settable for the menu item 303.

If a user sets the automatic exposure adjustment function to "required", the digital camera 100 performs the above-described addition processing in the automatic exposure adjustment mode when a multiple-composited image to be recorded in the recording medium 120 is generated. If a user sets the automatic exposure adjustment function to "not required", the digital camera 100 performs the above-described addition processing in the addition mode when a multiple-composited image to be recorded in the recording medium 120 is generated. The menu item 303 cannot be selectively changed in the state where the multiple-exposure imaging operation is in progress.

The menu item 304 is a menu item that allows users to select a base image in the multiple-exposure image capturing. Each user can select one image from a plurality of images recorded in the recording medium 120 (i.e., the images having been recorded before the multiple-exposure imaging mode is set) and set the selected image as a base image.

The menu item 304 is settable only when the multiple-exposure image capturing necessity setting is set to "required" and in a state where the multiple-exposure imaging operation is not in progress. More specifically, setting of a base image in the menu item 304 is feasible if the image capturing of the first image is not started after the multiple-exposure image capturing necessity setting is set to "required." For example, a screen illustrated in FIG. 3B can be displayed in response to the setting of a base image.

An image 306 is an example image having been set as a base image, which can be selected from the images recorded in the recording medium. The video signal processing circuit 116 reads the base image from the recording medium 120 and loads converted development data to the buffer memory 122 when one or more imaging operations have been performed in the multiple-exposure imaging mode or when the live view display operation is started.

If a user selects a base image, the digital camera 100 sets an image size, as one of imaging conditions, to be similar to that of the base image. More specifically, the digital camera 100 determines the image size, which is similar to that of the base image, for images to be captured in the next and subsequent multiple-exposure imaging operations. As described above, if a user selects a base image, the digital camera 100 can perform the multiple-exposure image capturing using a previously captured image as the first image.

In the present exemplary embodiment, only the image previously captured by the digital camera 100 is selectable as a base image because of the necessity of adjusting the image size of the image. However, if a concerned image other than the images captured by the digital camera 100 has an image size that is settable as an imaging condition for the digital camera 100, the concerned image can be set as a base image.

Further, in a case where a target image has an image size that cannot be set as an imaging condition for the digital camera 100, the video signal processing circuit 116 can resize the target image so that the target image can be set as a base image. The digital camera 100 deselects the base image setting upon termination of the multiple-exposure image capturing. Thus, the digital camera 100 is brought into a state where no base image is selected. An image selection releasing button 305 is a button icon that allows users to cancel the selected base image. If the releasing button 305 is pressed, the digital camera 100 is brought into a state where no base image is selected.

FIGS. 4A to 4E illustrate example data stored in the buffer memory 122 when the multiple-exposure image capturing is performed by the digital camera 100. The data storable in the buffer memory 122 during each imaging operation can be classified into five types of image data, i.e., development data, high-precision data, multiple development data, multiple display data, and prior imaging multiple display data.

To obtain the development data, the digital camera 100 performs development processing (e.g., color processing) on an image signal obtained from the image sensor in a precedent imaging operation. The digital camera 100 compresses the development data into JPEG format data to generate an image file of each original image to be recorded in the recording medium 120.

To obtain the high-precision data, the digital camera 100 causes the video signal processing circuit 116 to convert development data obtained in the prior imaging operation into higher-bit data (i.e., precision enhanced data) for the multiple-compositing and add the processed image data to high-precision data having been already generated in the preceding processing.

Enhancing the precision of image data is useful to prevent the gradation from being saturated during the multiple-compositing processing. However, the digital camera 100 can employ any other method to enhance the precision of image data if it can facilitate the multiple-compositing processing.

To obtain the multiple development data, the digital camera 100 adds development data acquired in the present imaging operation to currently generated high-precision data (i.e., the data multiple composited with the previously captured image). The digital camera 100 compresses the multiple development data into JPEG format data to generate an image file of a multiple-composited image to be recorded in the recording medium 120.

To obtain the multiple display data, the digital camera 100 performs reduction and compression processing on multiple development data for the display of the image data. More specifically, the digital camera 100 performs a multiple compositing in-progress quick review (hereinafter, referred to as QR) and reproduction processing, and a multiple-compositing in-progress first image QR and reproduction processing based on the multiple display data.

The prior imaging multiple display data is multiple display data that the digital camera 100 has generated in the preceding image capturing processing. A multiple image combination and a multiple image combination result image may refer to an image generated by superimposing, composing, synthesizing, or merging images by way of example and not of limitation. Multiple image combination and multiple image combination result image do not refer to synthesizing a plurality of images that are placed in a tile-arranged configuration such as is done for a panoramic effect. Multiple image combination and multiple image combination result image may be referred to as multiple-synthesize image, multiple-composite image, multiple image combination image, or multiple-composite image.

FIGS. 4A to 4D illustrate respective states of the data stored in the buffer memory 122 in the multiple-exposure image capturing, in a case where no base image is present.

FIG. 4A illustrates a state of the buffer memory 122 at the time when the image capturing of the first image has been completed. When the digital camera 100 obtains an image signal A in the image capturing of the first image, the digital camera 100 stores development data A of the image signal A in the buffer memory 122. However, at this moment, the digital camera 100 generates and stores no high-precision data, no multiple development data, no multiple display data, and no prior imaging multiple display data. Therefore, the buffer memory 122 has a sufficient capacity.

When a sufficient capacity is available to store high-precision data, multiple development data, multiple display data, and prior imaging multiple display data, the digital camera 100 can allocate the remaining capacity of the buffer memory 122 to other processing. Thus, the digital camera 100 can speedily accomplish other processing. For example, the digital camera 100 can perform live view image capturing based face detection processing and contrast AF processing, as other processing.

FIG. 4B illustrates a state of the buffer memory 122 at the time when the image capturing of the second image has been completed. When the digital camera 100 obtains an image signal B in the image capturing of the second image, the digital camera 100 generates development data B of the image signal B and stores the generated development data B in the buffer memory 122.

Further, the digital camera 100 enhances the precision of the development data A stored after completing the image capturing of the first image and stores the processed data as high-precision data A (no high-precision data is stored at the time when the image capturing of the first image is completed and therefore no addition is performed). The digital camera 100 generates multiple development data A+B by multiple-compositing the high-precision data A and the development data B, and stores the generated multiple development data A+B. Further, the digital camera 100 generates multiple display data A+B by performing reduction and compression processing on the multiple development data A+B.

Further, in the image capturing of the second image, the digital camera 100 generates prior imaging multiple display data based on an image file of the first image A recorded in the recording medium 120 because no multiple display data is generated during the image capturing of the first image.

FIG. 4C illustrates a state of the buffer memory 122 at the time when the image capturing of the third image has been completed. When the digital camera 100 obtains an image signal C in the image capturing of the third image, the digital camera 100 generates development data C of the image signal C and stores the generated development data C in the buffer memory 122.

Further, the digital camera 100 enhances the precision of the development data B stored after completing the image capturing of the second image. Then, the digital camera 100 generates a high-precision data A+B by adding the processed data (i.e., high-precision data A) with the high-precision data A having been stored after completing the image capturing of the second image. The digital camera 100 stores the generated high-precision data A+B. Further, the digital camera 100 generates multiple development data A+B+C by multiple-compositing the high-precision data A+B with the development data C.

Then, the digital camera 100 generates multiple display data A+B+C by performing reduction and compression processing on the multiple development data A+B+C, and stores the generated multiple display data A+B+C. Further, the digital camera 100 stores the multiple display data A+B having been generated during the image capturing of the second image as prior imaging multiple display data A+B.

FIG. 4D illustrates a state of the buffer memory 122 in a case where the image having been obtained during the image capturing of the third image is discard by multiple compositing in-progress QR and reproduction processing. If a user discards the image having been obtained through the image capturing of the third image, the digital camera 100 deletes the development data C, the multiple development data A+B+C, and the multiple display data A+B+C from the buffer memory 122, as understood from the comparison with the state illustrated in FIG. 4C. Further, the digital camera 100 stores the prior imaging multiple display data A+B (see FIG. 4C) as multiple display data A+B as illustrated in FIG. 4D.

FIG. 4E illustrates a state of the buffer memory 122 at the time when the image capturing of the third image has been performed again. When the digital camera 100 obtains an image signal D in the re-image capturing of the third image (i.e., in the image capturing of the multiple-exposure imaging mode in response to a re-image-capturing instruction), the digital camera 100 generates development data D of the image signal D, and stores the generated development data D in the buffer memory 122.

Further, the digital camera 100 keep storing the high-precision data A+B having been stored after the discard of the third image. The digital camera 100 generates multiple development data A+B+D by multiple-compositing the high-precision data A+B with the development data D, and stores the generated multiple development data A+B+D. The digital camera 100 generates multiple display data A+B+D by performing reduction and compression processing on the multiple development data A+B+D, and stores the generated multiple display data A+B+D. Further, the digital camera 100 stores the multiple display data A+B having been stored after the discard of the third image as prior imaging multiple display data A+B.

Next, example data that can be used in the multiple-exposure image capturing processing is described below. The digital camera 100 uses the following parameters to perform the multiple-exposure image capturing processing.

"Multiple-exposure image capturing necessity setting" is a parameter that enables users to set "required" or "not required." The digital camera 100 records a setting value in the nonvolatile memory 130 or in the system memory 132. When the setting value is "required", it indicates that the current mode is the multiple-exposure imaging mode.

"Multiple-exposure image capturing in-progress flag" is a parameter that indicates whether the multiple-exposure image capturing is currently in progress. The digital camera 100 stores flag information in the system memory 132. If a user performs at least one imaging operation after setting the multiple-exposure image capturing necessity setting to "required", the digital camera 100 sets the multiple-exposure image capturing in-progress flag to 1. The flag value "1" indicates that the multiple-exposure imaging operation is currently in progress. If the multiple-exposure image capturing terminates, the digital camera 100 sets the multiple-exposure image capturing in-progress flag to 0. The flag can be referred to in determining whether to perform a quick review operation as ordinary processing or multiple-compositing in-progress processing.

"Number of multiple-exposure image capturing scheduled images" is a value indicating the total number of multiple-exposure imaging operations (hereinafter, referred to as one-set multiple-exposure imaging operation) required to generate a single multiple image. The digital camera 100 stores the value (i.e., the total number) in the system memory 132. In a case where no base image is set, the number of multiple-exposure image capturing scheduled images is equal to the number of images having been set in the menu item 302 illustrated in FIGS. 3A and 3B. If a base image is present, the number of multiple-exposure image capturing scheduled images is smaller than the number of images having been set in the menu item 302 illustrated in FIG. 3 by one.

"Number of multiple-exposure image capturing completed images" is a value indicating the number of images that have been currently captured in a one-set multiple-exposure imaging operation. The digital camera 100 stores the value (i.e., the current number) in the system memory 132. When the number of multiple-exposure image capturing completed images is equal to the number of multiple-exposure image capturing scheduled images, it means that the one-set multiple-exposure imaging operation has been completed. Thus, the digital camera 100 terminates the multiple-exposure image capturing processing.

"Enlargement mode flag" is a parameter that manages the state of an enlargement mode that allows users to enlarge an image in a live view display operation. The digital camera 100 stores flag information in the system memory 132. Each time a user presses the enlargement button 23, the digital camera 100 switches the display mode to "enlargement mode OFF" (full-screen display of a through image), "enlargement mode (five times enlargement)", and "enlargement mode (ten times enlargement)" in this order.

Display type "Gs" is a parameter that indicates the type having been selected from a plurality of information display types. In the present exemplary embodiment, there are six types of "1" to "6" that are selectable as the display type, in which Gs represents the number (No.) of the selected display type.

"Fmov" is a flag that indicates whether the display type has been changed from "6" (i.e., multiple live view display) to other display type according to a user operation. The digital camera 100 changes the flag Fmov to 1 if the display type has been changed from "6" to other display type according to a user operation. Otherwise, the digital camera 100 sets the flag Fmov to 0.

"Gr" indicates the display type stored in the system memory 132 before the digital camera 100 starts a multiple live view display operation. If the display type is automatically changed to "6" (i.e., multiple information display type), the digital camera 100 stores the display type selected immediately before as Gr. When the multiple-exposure imaging operation terminates, the digital camera 100 returns the display mode to the original type with reference to Gr.

Further, when the multiple-exposure imaging operation is in progress, the digital camera 100 records information indicating a storage place of each original image currently captured in one-set multiple-exposure imaging operation on the recording medium 120, as writing completed file information, in the system memory 132. In a case where a plurality of recording media is available to record images, the digital camera 100 records information identifying a storage destination (i.e., a recording medium) of each image.

In the present exemplary embodiment, in a state where the live view display is in progress, the digital camera 100 can realize an information display according to any one of the following six display types. FIG. 16 illustrates display examples of the six display types.

Display type "1" is a display type that the digital camera 100 can superimpose a contrast measurement area frame for the AF (i.e., an AF frame) on a through image.

Display type "2" is a display type that the digital camera 100 can display some of present setting values (e.g., shutter speed, diaphragm value, and exposure correction value) of the digital camera 100 and the number of remaining capturable images that can be stored in the recording medium 120, in addition to the display contents according to the display type "1."

Display type "3" is a display type that the digital camera 100 can additionally display present setting values (e.g., imaging mode, AF type, and size of captured image) of the digital camera 100, in addition to the display contents according to the display type "2."

Display type "4" is a display type that the digital camera 100 can display a luminance histogram of the through image, in addition to the display contents according to the display type "3."

Display type "5" is a display type that the digital camera 100 can display inclination information of the digital camera 100 that is detectable using a leveling instrument, in addition to the display contents according to the display type "3."

Display type "6" is a display type that the digital camera 100 can display a screen for the multiple-exposure image capturing, which is referred to as "multiple live view display." The digital camera 100 displays an AF frame superimposed on a composite image that can be obtained by multiple-compositing a base image (in a case where the base image setting is "required"), a prior image already captured after the mode is switched to the multiple-exposure imaging mode, and a through image.

Further, the digital camera 100 displays an icon indicating that the multiple-exposure imaging mode is set and the number of remaining images that can be captured with reference to the number of multiple-exposure image capturing scheduled images (=the number of multiple-exposure image capturing scheduled images−the number of multiple-exposure image capturing completed images). According to the example illustrated in FIG. 16, the number of remaining images that can be captured is two. It may be desired that the digital camera 100 displays at least one of the number of multiple-exposure image capturing scheduled images and the number of multiple-exposure image capturing completed images.

In the present exemplary embodiment, to assure the visibility of a composite image that can be obtained by multiple-compositing a previously captured image and a through image, the digital camera 100 displays a minimum amount of information and does not display any other additional information.

For example, the setting values that are not displayed by the digital camera 100 include shutter speed, diaphragm value, exposure correction value, number of remaining capturable images that can be stored in the recording medium 120, AF type, size of captured image, luminance histogram, and inclination information detectable using a leveling instrument.

Each user can toggle the information display button 16 to arbitrarily change the setting with respect to the display type. However, selecting the display type "6" (i.e., multiple live view display) is allowed only when the digital camera 100 is operating in the multiple-exposure imaging mode.

Figure 17A:
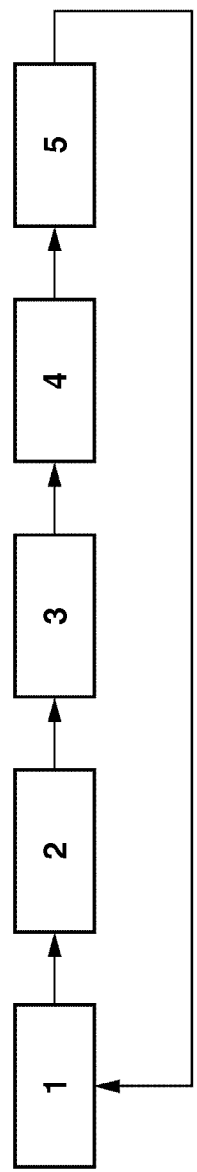
FIGS. 17A and 17B illustrate display type change order patterns according to an exemplary embodiment of the present invention.
Figure 17B:
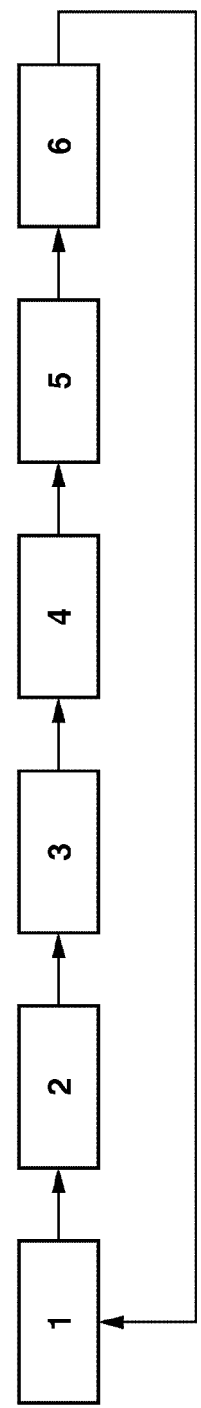

FIGS. 17A and 17B illustrate display type switching order patterns that the digital camera 100 can selectively set in response to the pressing of the information display button 16. In a case where the digital camera 100 is not operating in the multiple-exposure imaging mode, or if an image to be multiple cannot be acquired even when the digital camera 100 is operating in the multiple-exposure imaging mode, the digital camera 100 changes the display type according to the switching order pattern illustrated in FIG. 17A.

According to the pattern illustrated in FIG. 17A, the digital camera 100 changes the display type to "2" if the previously selected (displayed) type is "1", to "3" if "2", to "4" if "3", to "5" if "4", and to "1" if "5" each time the information display button 16 is pressed. In a case where the digital camera 100 is operating in the multiple-exposure imaging mode, and if an image to be multiple is already acquired, the digital camera 100 changes the display type according to the switching order pattern illustrated in FIG. 17B.

According to the pattern illustrated in FIG. 17B, the digital camera 100 changes the display type to "2" if the previously selected (displayed) type is "1", to "3" if "2", to "4" if "3", to "5" if "4", to "6" if "5", and to "1" if "6" each time the information display button 16 is pressed.

Figure 5:
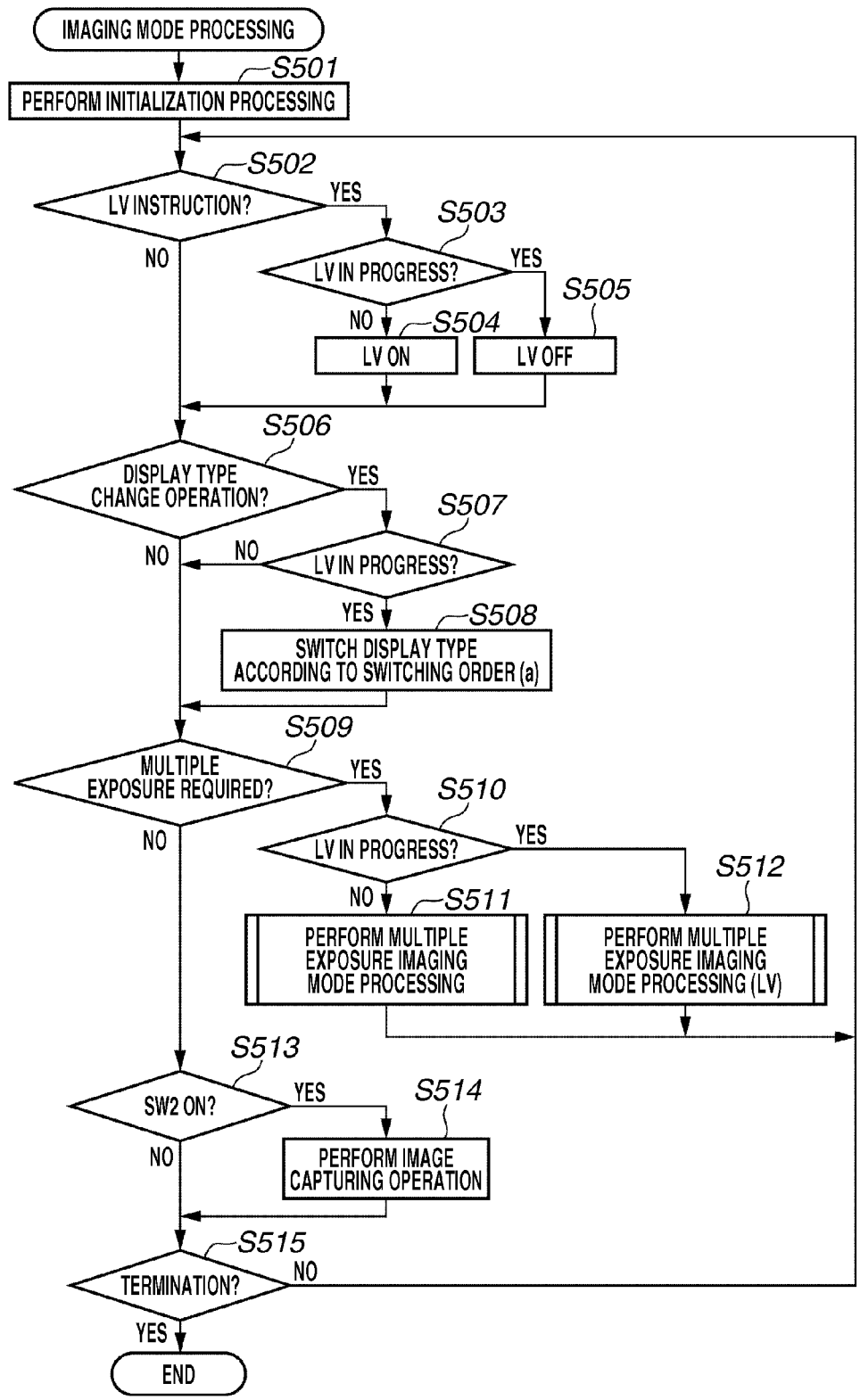
FIG. 5 is a flowchart illustrating imaging mode processing that can be performed by the digital camera 100 according to an exemplary embodiment of the present invention.

FIG. 5 is a flowchart illustrating an example of imaging mode processing. To realize the processing illustrated in FIG. 5, the microcomputer 123 executes a program loaded into the system memory 132 from the nonvolatile memory 130. If the digital camera 100 is activated and the imaging mode is set, the microcomputer 123 starts the processing illustrated in FIG. 5.

In step S501, the microcomputer 123 performs initialization processing that includes a control for resetting various parameters to be used in the imaging mode processing and bringing each unit into an imaging standby state.

In step S502, the microcomputer 123 determines whether a live view display start instruction has been received. More specifically, the microcomputer 123 determines whether the live view button 27 has been pressed. If it is determined that the live view button 27 has been pressed (YES in step S502), the processing proceeds to step S503. If it is determined that the live view button 27 has not been pressed (NO in step S502), the processing proceeds to step S506.

In step S503, the microcomputer 123 determines whether the live view display is now in progress. If it is determined that the live view display is not in progress (NO in step S503), the processing proceeds to step S504. The microcomputer 123 causes the mirror driving circuit 107 to perform a mirror-up operation to start a live view display operation. If it is determined that the live view display is now in progress (YES in step S503), the processing proceeds to step S505. The microcomputer 123 causes the mirror driving circuit 107 to perform a mirror-down operation to terminate the live view display operation.

In step S506, the microcomputer 123 determines whether the information display button 16 has been pressed to change the display type. If it is determined that the information display button 16 has been pressed (YES in step S506), the processing proceeds to step S507. If it is determined that the information display button 16 has not been pressed (NO in step S506), the processing proceeds to step S509.

In step S507, the microcomputer 123 determines whether the live view display is now in progress. If it is determined that the live view display is not in progress (NO in step S507), the processing proceeds to step S509. If it is determined that the live view display is now in progress (YES in step S507), the processing proceeds to step S508.

In step S508, the microcomputer 123 switches the display type according to the above-described switching pattern illustrated in FIG. 17A. In other words, the microcomputer 123 does not switch the display type to "6" in the multiple live view display.

In step S509, the microcomputer 123 determines whether the multiple-exposure image capturing is set to "required" with reference to the multiple-exposure image capturing necessity setting stored in the system memory 132 or in the nonvolatile memory 130. If it is determined that the multiple-exposure image capturing is set to "required" (YES in step S509), the processing proceeds to step S510. If it is determined that the multiple-exposure image capturing is not set to "required" (NO in step S509), the processing proceeds to step S513.

In step S510, the microcomputer 123 determines whether the live view display is now in progress. If it is determined that the live view display is not in progress (NO in step S510), then in step S511, the microcomputer 123 performs multiple-exposure imaging mode processing. The multiple-exposure imaging mode processing according to the present exemplary embodiment is described in detail below with reference to FIG. 6. If it is determined that the live view display is now in progress (YES in step S510), then in step S512, the microcomputer 123 performs multiple-exposure imaging mode processing (LV) accompanied by the live view display. The multiple-exposure imaging mode processing (LV) accompanied by the live view display is described in detail below with reference to FIG. 9 and FIG. 10.

In step S513, the microcomputer 123 determines whether the switch SW2 is ON. If it is determined that the switch SW2 is ON (YES in step S513), the processing proceeds to step S514. If it is determined that the switch SW2 is not ON (NO in step S513), the processing proceeds to step S515. In step S514, the microcomputer 123 performs an image capturing operation based on imaging conditions having been set beforehand. The microcomputer 123 performs image processing on captured image data and records the processed image data as an image file in the recording medium 120. The image capturing processing to be performed in step S514 is referred to as "main imaging", which can be discriminated from a through image capturing operation.

In step S515, the microcomputer 123 determines whether an imaging mode termination event has occurred.

For example, the imaging mode termination event includes an event that causes the microcomputer 123 to start an operation according to an operational mode other than the imaging mode (e.g., the reproduction mode). The imaging mode termination event further includes an event that turns off the power source, such as a turn-off motion of the main SW 20, an opening motion of the card cover 28, an opening motion of the battery cover 29, and an auto power OFF event.

If it is determined that no imaging mode termination event has occurred (NO in step S515), the processing returns to step S502. The microcomputer 123 repeats the above-described processing. If it is determined that the imaging mode termination event has occurred (YES in step S515), the microcomputer 123 terminates the imaging mode processing illustrated in FIG. 5.

Figures 6, 6A:
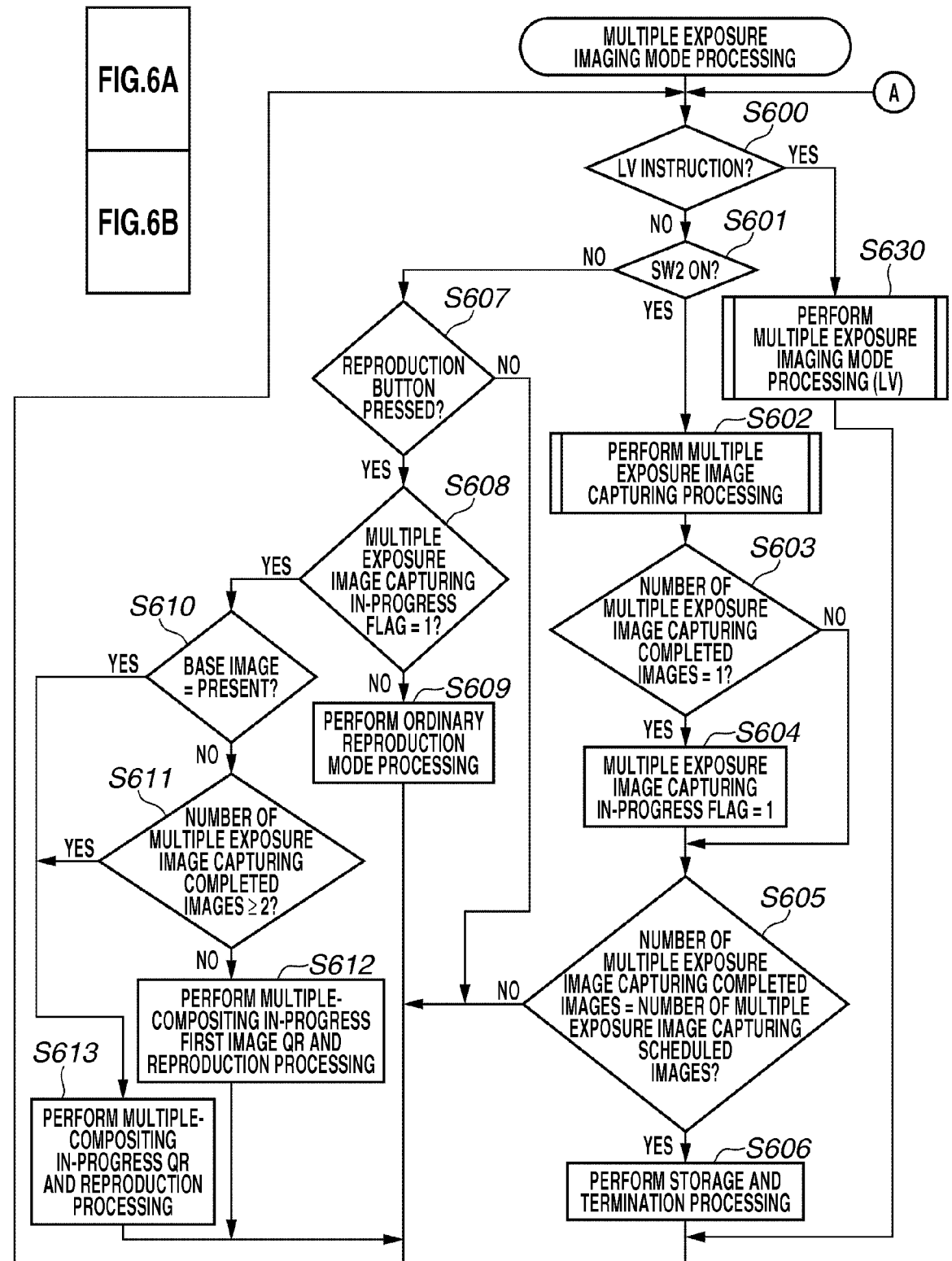
FIG. 6 (6A+6B) is a flowchart illustrating multiple-exposure imaging mode processing that can be performed by the digital camera 100 according to an exemplary embodiment of the present invention.
Figure 6B:
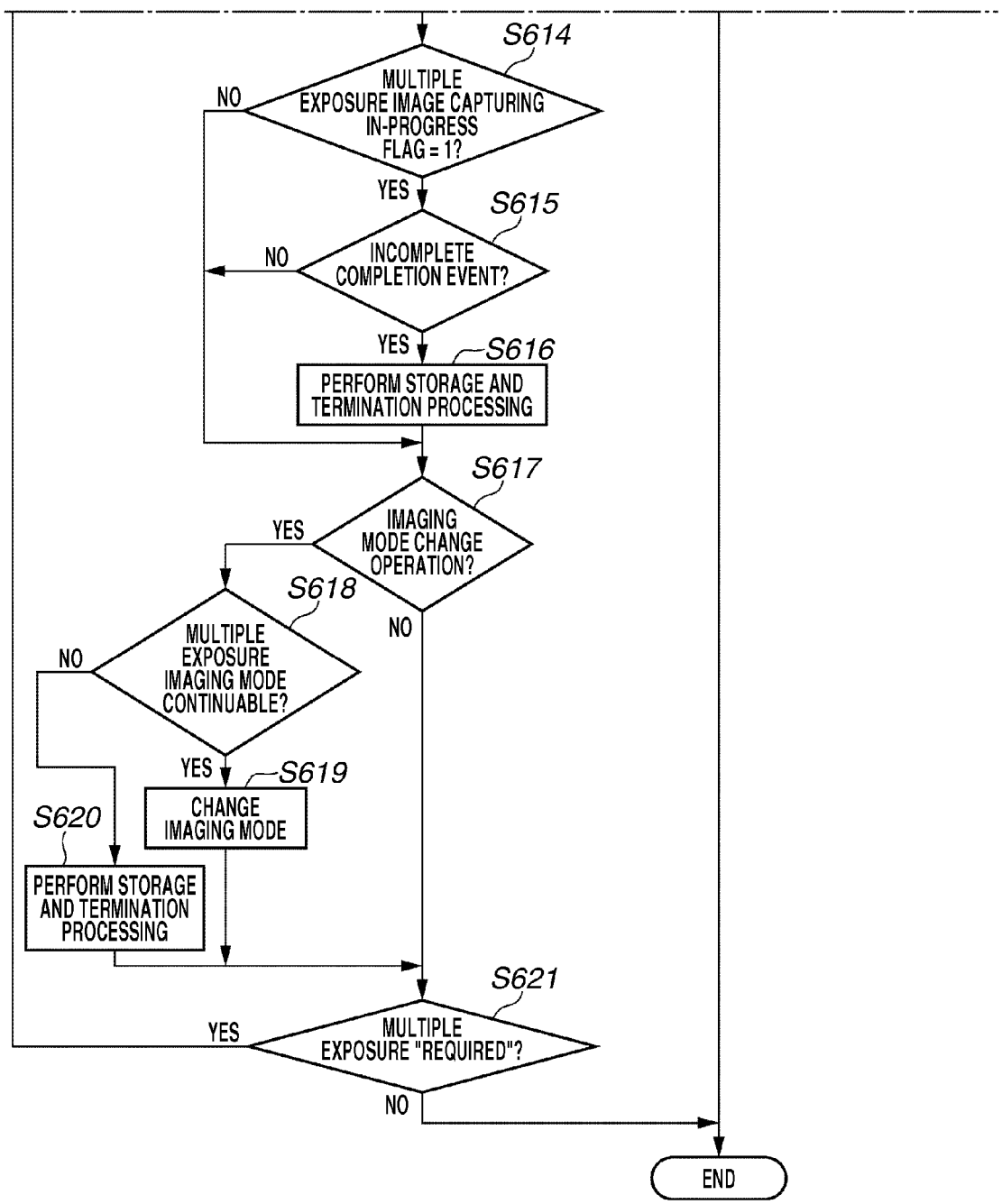

FIG. 6 (6A+6B) is a flowchart illustrating details of the multiple-exposure imaging mode processing. To realize the processing illustrated in FIG. 6, the microcomputer 123 executes a program loaded into the system memory 132 from the nonvolatile memory 130. If the multiple-exposure image capturing necessity setting is set to "required", the microcomputer 123 starts the processing illustrated in FIG. 6.

In step S600, the microcomputer 123 determines whether the live view display start instruction has been received. More specifically, the microcomputer 123 determines whether the live view button 27 has been pressed. If it is determined that the live view button 27 has been pressed (i.e., when the live view display start instruction has been received) (YES in step S600), the processing proceeds to step S630. If it is determined that the live view button 27 is not pressed (NO in step S600), the processing proceeds to step S601.

In step S630, the microcomputer 123 performs the multiple-exposure imaging mode processing (LV) accompanied by the live view display. The multiple-exposure imaging mode processing (LV) accompanied by the live view display is described in detail below with reference to FIG. 9 and FIG. 10 (10A+10B).

In step S601, the microcomputer 123 determines whether the switch SW2 is ON. If it is determined that the switch SW2 is ON (YES in step S601), the processing proceeds to step S602. If it is determined that the switch SW2 is not ON (NO in step S601), the processing proceeds to step S607.

In step S602, the microcomputer 123 performs the multiple-exposure image capturing processing. The multiple-exposure image capturing processing is described in detail below with reference to FIG. 7.

In step S603, the microcomputer 123 determines whether the number of multiple-exposure image capturing completed images is one with reference to the system memory 132. More specifically, the microcomputer 123 determines whether the first image of the one-set multiple-exposure image capturing has been captured in the multiple-exposure image capturing processing performed in step S602.

If it is determined that the number of multiple-exposure image capturing completed images is one (YES in step S603), the processing proceeds to step S604. The microcomputer 123 sets the multiple-exposure image capturing in-progress flag to 1, and stores the flag information in the system memory 132. If it is determined that the number of multiple-exposure image capturing completed images is not one (NO in step S603), or after the multiple-exposure image capturing in-progress flag has been set to 1 in step S604, the processing proceeds to step S605.

In step S605, the microcomputer 123 determines whether the number of multiple-exposure image capturing completed images stored in the system memory 132 has become equal to the number of multiple-exposure image capturing scheduled images. If it is determined that the number of multiple-exposure image capturing completed images is equal to the number of multiple-exposure image capturing scheduled images (YES in step S605), it means that the one-set multiple-exposure imaging operation has been completed. Thus, in step S606, the microcomputer 123 completes the multiple-exposure imaging mode processing after performing "storage and termination processing."

In the "storage and termination processing" to be performed in step S606, the microcomputer 123 terminates the multiple-exposure image capturing processing at this moment, and generates a multiple composite image based on a plurality of images having been already acquired at this moment, and records the generated multiple-composite image as an image file in the recording medium 120. To generate the multiple-composite image, the microcomputer 123 refers to the automatic exposure adjustment function setting of the menu screen illustrated in FIG. 3. If it is determined that the automatic exposure adjustment function is set to "required", the microcomputer 123 performs the multiple-compositing processing based on the above-described formula (4).

If it is determined that the automatic exposure adjustment function is set to "not required", the microcomputer 123 performs the multiple-compositing processing based on the above-described formula (3).

Further, the microcomputer 123 performs initialization processing for the multiple-exposure image capturing. In the initialization processing, the microcomputer 123 discards all the image data recorded in the buffer memory 122. The microcomputer 123 resets the number of multiple-exposure image capturing scheduled images and the number of multiple-exposure image capturing completed images, which are stored in the system memory 132. The microcomputer 123 changes the multiple-exposure image capturing necessity setting to "not required." The microcomputer 123 sets the multiple-exposure image capturing in-progress flag stored in the system memory 132 to 0. Further, the microcomputer 123 deletes the entire contents of the writing completed file information stored in the system memory 132.

On the other hand, in step S607, the microcomputer 123 determines whether the reproduction button 18 has been pressed (whether a reproduction mode start instruction has been received). If it is determined that the reproduction button 18 has been pressed (YES in step S607), the processing proceeds to step S608. If it is determined that the reproduction button 18 has not been pressed (NO in step S607), the processing proceeds to step S614.

In step S608, the microcomputer 123 determines whether the multiple-exposure image capturing in-progress flag is 1 (whether the multiple-exposure imaging operation is in progress) with reference to the system memory 132. If it is determined that the multiple-exposure image capturing in-progress flag is 1 (YES in step S608), the processing proceeds to step S610. If it is determined that the multiple-exposure image capturing in-progress flag is not 1 (NO in step S608), the processing proceeds to step S609.

In step S609, the microcomputer 123 performs ordinary reproduction mode processing. In the ordinary reproduction mode processing, the microcomputer 123 performs reproduction mode processing (including single display, multiple display, image feeding, deletion, and attribute allocation) on each target of all images that are recorded in the recording medium 120 and reproducible by the digital camera 100.

In step S610, the microcomputer 123 determines whether the base image is set to "present." If it is determined that the base image is set to "absent" (NO in step S610), the processing proceeds to step S611. If it is determined that the base image is set to "present" (YES in step S610), the processing proceeds to step S613.

In step S611, the microcomputer 123 determines whether the number of multiple-exposure image capturing completed images stored in the system memory 132 is equal to or greater than two. If it is determined that the number of multiple-exposure image capturing completed images is equal to or greater than two (YES in step S611), the processing proceeds to step S613. If it is determined that the number of multiple-exposure image capturing completed images is less than two (NO in step S611), the processing proceeds to step S612. As the multiple-exposure image capturing in-progress flag is equal to 1, if the number of multiple-exposure image capturing completed images is less than two, the number of multiple-exposure image capturing completed images is equal to one.

In step S612, the microcomputer 123 performs multiple-compositing in-progress first image QR and reproduction processing. In the multiple-compositing in-progress first image QR and reproduction processing, the microcomputer 123 performs display processing to allow a user to confirm the first image having been captured after starting the multiple-exposure imaging mode operation and does not display any image captured before starting the multiple-exposure imaging mode operation.

More specifically, in the multiple-compositing in-progress first image QR and reproduction processing, the microcomputer 123 displays the first image having been captured after starting the multiple-exposure imaging mode operation on the display device 118.

Figure 8A:
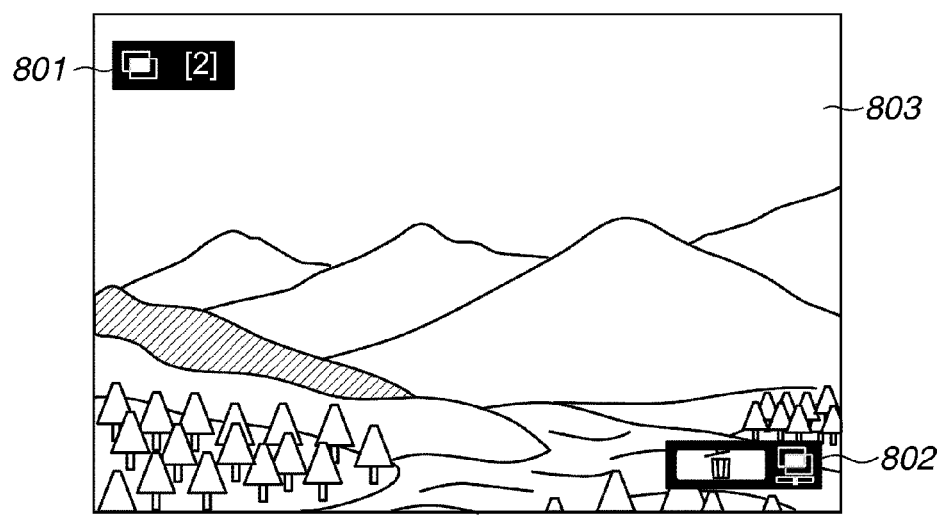
FIGS. 8A and 8B illustrate display examples of quick review and reproduction processing in a multiple-exposure imaging operation.

FIG. 8A illustrates a display example (a display control example) that can be displayed on the display device 118 through the multiple-compositing in-progress first image QR and reproduction processing during the multiple-exposure imaging operation. The display example illustrated in FIG. 8A corresponds to a case where the number of images to be superimposed in the multiple-exposure image capturing is set to three on the above-described menu item 302 and no base image is set in the menu item 304 (see FIG. 3A).

In FIG. 8A, a display item 801 includes an icon indicating an image obtained through the multiple-exposure image capturing and a numerical value "2" indicating that two more images remain to reach the number of multiple-exposure image capturing scheduled images. A display item 802 is a guide display indicating that a processing selection dialog can be displayed by pressing the deletion button 19.

An image 803 is the only one image captured through the multiple-compositing processing. If a user cannot find any problem on the displayed image, the user performs the next imaging operation to accomplish the multiple-exposure image capturing.

To perform any other processing, the user can press the deletion button 19 to display the processing selection dialog. The processing selection dialog includes "back to immediately preceding image", "termination after storage", and "termination without storage" as processing options.

If the option "back to immediately preceding image" is selected, the microcomputer 123 deletes the displayed first image and performs the multiple-exposure image capturing processing again while maintaining the present settings relating to the multiple-exposure image capturing having been set on the menu screen illustrated in FIGS. 3A and 3B.

If the option "termination after storage" is selected, the microcomputer 123 immediately terminates the multiple-exposure imaging mode operation. Further, if the option "termination without storage" is selected, the microcomputer 123 immediately terminates the multiple-exposure imaging mode operation without recording the displayed first image in the recording medium 120 (or after deleting the first image from the recording medium 120). When the option "storage and termination processing" or the option "termination without storage processing" is selected, the microcomputer 123 sets the multiple-exposure image capturing in-progress flag stored in the system memory 132 to 0 and sets the multiple-exposure image capturing necessity setting to "not required."

In step S613, the microcomputer 123 performs multiple-compositing in-progress QR and reproduction processing. In the multiple-compositing in-progress QR and reproduction processing, the microcomputer 123 performs display processing to allow a user to confirm a plurality of images having been acquired after starting the multiple-exposure imaging mode operation as well as the progress of the multiple-compositing processing. In this case, the microcomputer 123 does not display any image captured before starting the multiple-exposure imaging mode operation except for the base image.

Figure 8B:
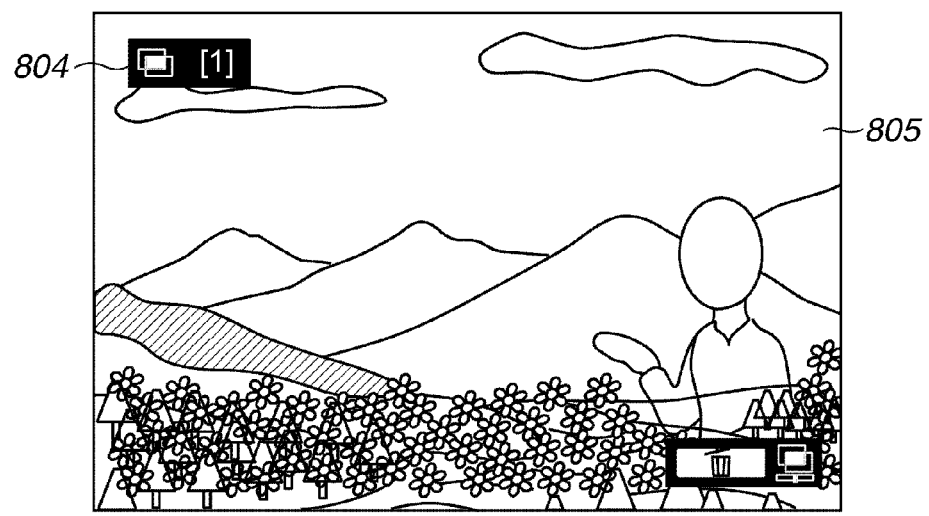

FIG. 8B illustrates a display example (a display control example) that can be displayed on the display device 118 through the multiple-compositing in-progress QR and reproduction processing during the multiple-exposure imaging operation. The display example illustrated in FIG. 8B corresponds to a case where the number of images to be superimposed in the multiple-exposure image capturing is set to three on the above-described menu item 302 and no base image is set in the menu item 304 (see FIG. 3A), similar to the example illustrated in FIG. 8A.

Further, the example illustrated in FIG. 8B is a display example that can be displayed after completing the image capturing of the second image. A display item 804 is similar to the display item 801 illustrated in FIG. 8A. The display item 804 indicates that only one (=2−1) image remains to reach the number of multiple-exposure image capturing scheduled images.

An image 805 is a multiple-composite image obtained by multiple-compositing the first image with the second image acquired in the present imaging operation. The image 805 corresponds to an example display of the multiple display data A+B illustrated in FIG. 4B. The multiple display data is a reduced version of a multiple-composite image that can be obtained by multiply-compositing a base image (if the base image is set) with the image presently captured after starting the multiple-exposure imaging mode operation based on the formula (3) or the formula (4) according to the mode.

More specifically, the multiple display data corresponds to an image that is multiple-composited at a compositing rate similar to that of the multiple-composite image generated through the storage and termination processing (i.e., the processing for generating a multiple-composite image to be to recorded in the recording medium 120) using the image (s) having been acquired at the moment when the multiple-exposure image capturing is terminated.

If a user cannot find any problem on the displayed image, the user performs the next imaging operation to accomplish the multiple-exposure image capturing. To perform any other processing, the user can press the deletion button 19 to display the processing selection dialog. The processing selection dialog includes "back to immediately preceding image", "termination after storage", and "termination without storage" as processing options.

If the option "back to immediately preceding image" is selected, the microcomputer 123 deletes only one image having been captured in the immediately preceding operation and restarts the multiple-exposure image capturing processing. If the option "termination after storage" is selected, the microcomputer 123 immediately terminates the multiple-exposure image capturing and generates a multiple-composite image based on the images having been acquired at this moment and records the generated multiple-composite image in the recording medium 120.

If the option "termination without storage" is selected, the microcomputer 123 immediately terminates the multiple-exposure image capturing without recording any multiple-composite image (i.e., an image obtainable by combining the images having been acquired at this moment) in the recording medium 120. When the option "storage and termination processing" or the option "termination without storage processing" is selected, the microcomputer 123 sets the multiple-exposure image capturing in-progress flag stored in the system memory 132 to 0 and sets the multiple-exposure image capturing necessity setting to "not required."

In step S614, the microcomputer 123 determines whether the multiple-exposure image capturing in-progress flag is 1 with reference to the system memory 132. If it is determined that the multiple-exposure image capturing in-progress flag is 1 (YES in step S614), the processing proceeds to step S615. If it is determined that the multiple-exposure image capturing in-progress flag is not 1 (NO in step S614), the processing proceeds to step S617.

In step S615, the microcomputer 123 determines whether an incomplete completion event has occurred. The incomplete completion event is an event that causes the digital camera 100 to forcibly stop the multiple-exposure imaging mode operation. For example, the incomplete completion event includes the following events.

An event that sets the multiple-exposure image capturing necessity setting to "not required" in response to a user operation An event that turns off the power source, such as a turning-off motion of the main SW 20, an opening motion of the card cover 28, an opening motion of the battery cover 29, and an auto power OFF An event that prevents the digital camera 100 from continuing the multiple-exposure image capturing processing due to a setting of imaging conditions If it is determined that the incomplete completion event has occurred (YES in step S615), the processing proceeds to step S616. If it is determined that the incomplete completion event has not occurred (NO in step S615), the processing proceeds to step S617.

In step S616, the microcomputer 123 performs "storage and termination processing." The processing to be performed in step S616 is similar to the above-described processing performed in step S606.

In step S617, the microcomputer 123 determines whether an imaging mode change operation has been accepted. In the determination to be performed in step S617, the microcomputer 123 determines whether the imaging mode dial 14 has been rotated, instead of checking the presence of any operation that directly changes the multiple-exposure image capturing necessity setting. If it is determined that the imaging mode change operation has been accepted (YES in step S617), the processing proceeds to step S618. If it is determined that the imaging mode change operation has not been accepted (NO in step S617), the processing proceeds to step S621.

In step S618, the microcomputer 123 determines whether a target imaging mode to which the mode is switched by the imaging mode change operation is a first imaging mode that is predetermined as an imaging mode that can continue the multiple-exposure imaging mode processing.

Although there is a plurality of imaging modes that can be selected using the imaging mode dial 14, the first imaging modes that can continue the multiple-exposure imaging mode processing include, for example, a manual mode, a shutter speed priority mode, a diaphragm priority mode, a program AE mode, and a valve mode.

On the other hand, the plurality of imaging modes that can be selected using the imaging mode dial 14 include a second imaging mode that cannot continue the multiple-exposure imaging mode processing. For example, the second imaging mode includes a full-automatic mode, a flashlight inhibition mode, a creative full-automatic mode, a portrait mode, a landscape mode, a close-up mode, a sports mode, a night view portrait mode, and a moving image mode.

If it is determined that the target imaging mode is the imaging mode that can continue the multiple-exposure imaging mode processing (YES in step S618), the processing proceeds to step S619. If it is determined that the target imaging mode is the imaging mode that cannot continue the multiple-exposure imaging mode processing (NO in step S618), the processing proceeds to step S620.

In step S619, the microcomputer 123 switches the imaging mode to the one selected by the operation of the imaging mode dial 14, and continues the multiple-exposure imaging mode processing.

In this case, the microcomputer 123 maintains (does not change) the multiple-exposure image capturing necessity setting, the multiple-exposure image capturing in-progress flag, the number of multiple-exposure image capturing scheduled images, the number of multiple-exposure image capturing completed images, the writing completed file information, and the base image (if it is set).

In step S620, the microcomputer 123 performs "storage and termination processing." The processing to be performed in step S620 is similar to the above-described processing performed in step S606. However, if the number of images having been acquired at this moment is insufficient to generate a multiple-composite image, the microcomputer 123 does not generate any multiple-composite image. If the "storage and termination processing" is completed, the determination result in step S621 becomes "No." The multiple-exposure imaging mode processing automatically terminates in accordance with a user operation using the imaging mode dial 14.

In this case, a message display indicating that the multiple-exposure imaging mode processing has been automatically completed (i.e., the multiple-exposure imaging mode is deselected) can be displayed on the display device 118. Upon termination of the multiple-exposure imaging mode, the microcomputer 123 switches the imaging mode according to the operation of the imaging mode dial 14.

In step S621, the microcomputer 123 determines whether the multiple-exposure image capturing is set to "required" with reference to the multiple-exposure image capturing necessity setting stored in the system memory 132 or in the nonvolatile memory 130. If it is determined that the multiple-exposure image capturing is set to "required" (YES in step S621), the processing returns to step S600. The microcomputer 123 repeats the above-described processing. If it is determined that the multiple-exposure image capturing is set "to be not performed" (NO in step S621), the microcomputer 123 terminates the multiple-exposure imaging mode processing illustrated in FIG. 6. Then, the processing proceeds to the above-described step S502 illustrated in FIG. 5.

Figure 7:
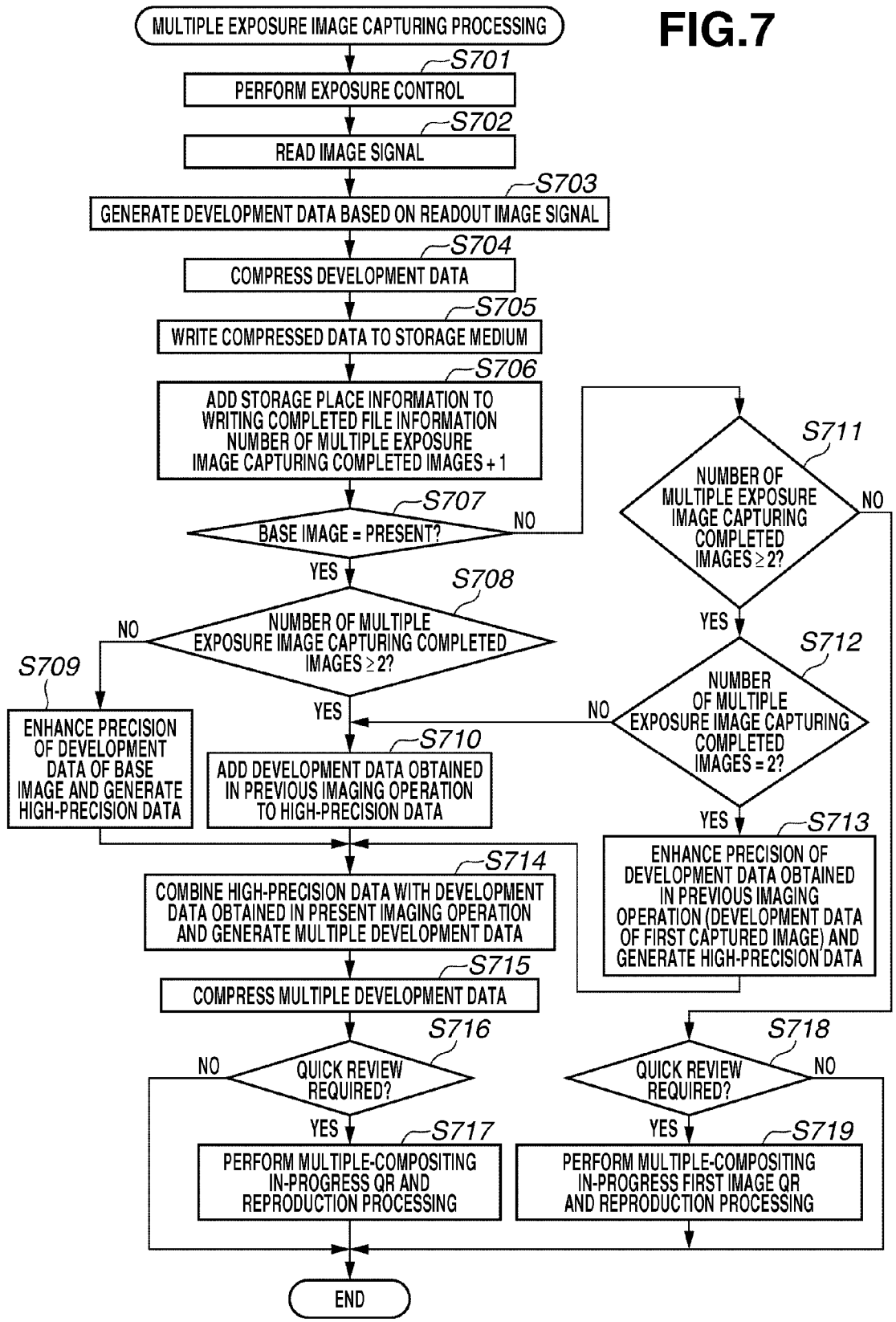
FIG. 7 is a flowchart illustrating multiple-exposure image capturing processing that can be performed by the digital camera 100 according to an exemplary embodiment of the present invention.

FIG. 7 is a flowchart illustrating the multiple-exposure image capturing processing to be performed in the above-described step S602 illustrated in FIG. 6. To realize the processing illustrated in FIG. 7, the microcomputer 123 executes a program loaded into the system memory 132 from the nonvolatile memory 130. The multiple-exposure imaging mode processing illustrated in FIG. 7 is referred to as "main image capturing", which can be discriminated from a through image capturing operation.

In step S701, the microcomputer 123 performs a power supply control when the image sensor 112 and the AD converter 115 are in a power save mode. Further, the microcomputer 123 performs an exposure control. If the exposure control is completed, then in step S702, the microcomputer 123 causes the AD converter 115 to read an image signal from the image sensor 112 and convert the readout image signal into a digital signal.

In step S703, the microcomputer 123 instructs the video signal processing circuit 116 to generate development data based on the image signal read in step S702. The generated development data is stored in the buffer memory 122, as described with reference to FIGS. 4A to 4E.

In step S704, the microcomputer 123 causes the video signal processing circuit 116 to compress the development data generated in step S703. Then, in step S705, the video signal processing circuit 116 records the compressed data as an image file in the recording medium 120 via the memory controller 119. The image file to be recorded in this case is a single original image, not a composite image.

Subsequently, in step S706, the microcomputer 123 records information indicating a storage place of the image file recorded in step S705, as an additional information, to writing completed file information stored in the system memory 132. In this case, it is useful to record any information identifying the image file (e.g., a file name) instead of (or in addition to) the information indicating the storage place of the image file. Further, the microcomputer 123 increments by one the number of multiple-exposure image capturing completed images stored in the system memory 132.

In step S707, the microcomputer 123 determines whether the base image is set to "present." If it is determined that the base image is "present" (YES in step S707), the processing proceeds to step S708. If it is determined that the base image is set to be "absent" (NO in step S707), the processing proceeds to step S711.

In step S708, the microcomputer 123 determines whether the number of multiple-exposure image capturing completed images is equal to or greater than two with reference to the system memory 132. If it is determined that the number of multiple-exposure image capturing completed images is less than two, more specifically if it is determined that only one imaging operation has been completed at this moment (NO in step S708), the processing proceeds to step S709. If it is determined that the number of multiple-exposure image capturing completed images is equal to or greater than two (YES in step S708), the processing proceeds to step S710.

In step S709, the microcomputer 123 reads a base image from the recording medium 120, and acquires development data of the base image. The microcomputer 123 causes the video signal processing circuit 116 to enhance the precision of the development data of the base image, and store the obtained high-precision data in the buffer memory 122.

More specifically, in the processing to be performed in step S709, the microcomputer 123 regards the base image as the image signal A acquired in the image capturing of the first image illustrated in FIG. 4A and regards the image data presently acquired in step S702 as the image signal B acquired in the image capturing of the second image illustrated in FIG. 4B.

In step S710, the microcomputer 123 causes the video signal processing circuit 116 to enhance the precision of the development data obtained in the prior imaging operation, and adds the processed development data (i.e., high-precision data) to the already generated high-precision data, and stores the added high-precision data in the buffer memory 122.

According to the above-described example, in the image capturing of the third image illustrated in FIG. 4C, the digital camera 100 enhances the precision of the development data B obtained in the image capturing of the second image, and adds the processed development data B (i.e., high-precision data B) to the high-precision data A generated in the image capturing of the second image. Thus, the digital camera 100 generates high-precision data A+B, and stores the generated high-precision data A+B in the buffer memory 122.

On the other hand, in step S711, the microcomputer 123 determines whether the number of multiple-exposure image capturing completed images is equal to or greater than two with reference to the system memory 132. If it is determined that the number of multiple-exposure image capturing completed images is equal to or greater than two (YES in step S711), the processing proceeds to step S712. If it is determined that the number of multiple-exposure image capturing completed images is less than two, more specifically when only one imaging operation has been completed at this moment (NO in step S711), the processing proceeds to step S718. The state of the buffer memory 122 illustrated in FIG. 4A corresponds to the case where the number of multiple-exposure image capturing completed images is only one in the determination of step S711.

In step S712, the microcomputer 123 determines whether the number of multiple-exposure image capturing completed images is two. If it is determined that the number of multiple-exposure image capturing completed images is not two, more specifically, when the number of multiple-exposure image capturing completed images is three or more (NO in step S712), the processing proceeds to step S710. If it is determined that the number of multiple-exposure image capturing completed images is two (YES in step S712), the processing proceeds to step S713.

In step S713, the microcomputer 123 causes the video signal processing circuit 116 to enhance the precision of the development data obtained in the prior imaging operation to generate high-precision data, and store the generated high-precision data in the buffer memory 122. According to the above-described example, in the image capturing of the second image illustrated in FIG. 4B, the digital camera 100 enhances the precision of the development data A obtained in the image capturing of the first image, and stores the processed development data A as high-precision data A in the buffer memory 122.

In step S714, the microcomputer 123 causes the video signal processing circuit 116 to multiple-composite the high-precision data generated in any one of step S709, step S710, and step S713 with the development data presently generated in step S703. More specifically, in step S714, the microcomputer 123 performs multiple-compositing processing based on the above-described formula (3) or (4) with reference to the automatic exposure adjustment function setting of the menu screen illustrated in FIG. 3.

In this case, Yn−1 represents the luminance of the high-precision data generated in any one of step S709, step S710, and step S713. Further, yn represents the luminance of the development data presently generated in step S703. The microcomputer 123 stores the image generated through the multiple-compositing processing as multiple development data in the buffer memory 122.

In step S715, the microcomputer 123 causes the video signal processing circuit 116 to perform reduction and compression processing on the multiple development data generated in step S714, and stores the processed data as multiple display data in the buffer memory 122.

In step S716, the microcomputer 123 determines whether the quick review (QR) is set to "required." In the present exemplary embodiment, it is feasible to set beforehand whether to perform the QR immediately after completing the imaging operation according to a user operation.

If it is determined that the QR is required (YES in step S716), then in step S717, the microcomputer 123 performs multiple-compositing in-progress QR and reproduction processing. The multiple-compositing in-progress QR and reproduction processing to be performed in step S717 is similar to the above-described processing performed in step S613 illustrated in FIG. 6. If it is determined that the QR is not required (NO in step S716), and when the multiple-exposure image capturing processing of step S717 is completed, the processing proceeds to the above-described step S603 illustrated in FIG. 6.

On the other hand, in step S718, the microcomputer 123 determines whether the quick review (QR) is set to "required." If it is determined that the QR is required (YES in step S718), then in step S719, the microcomputer 123 performs multiple-compositing in-progress first image QR and reproduction processing. The multiple-compositing in-progress first image QR and reproduction processing to be performed in step S719 is similar to the above-described processing described in step S612 of FIG. 6. If it is determined that the QR is not required (NO in step S718), and when the multiple-exposure image capturing processing of step S719 is completed, the processing proceeds to the above-described step S603 illustrated in FIG. 6.

Figure 9:
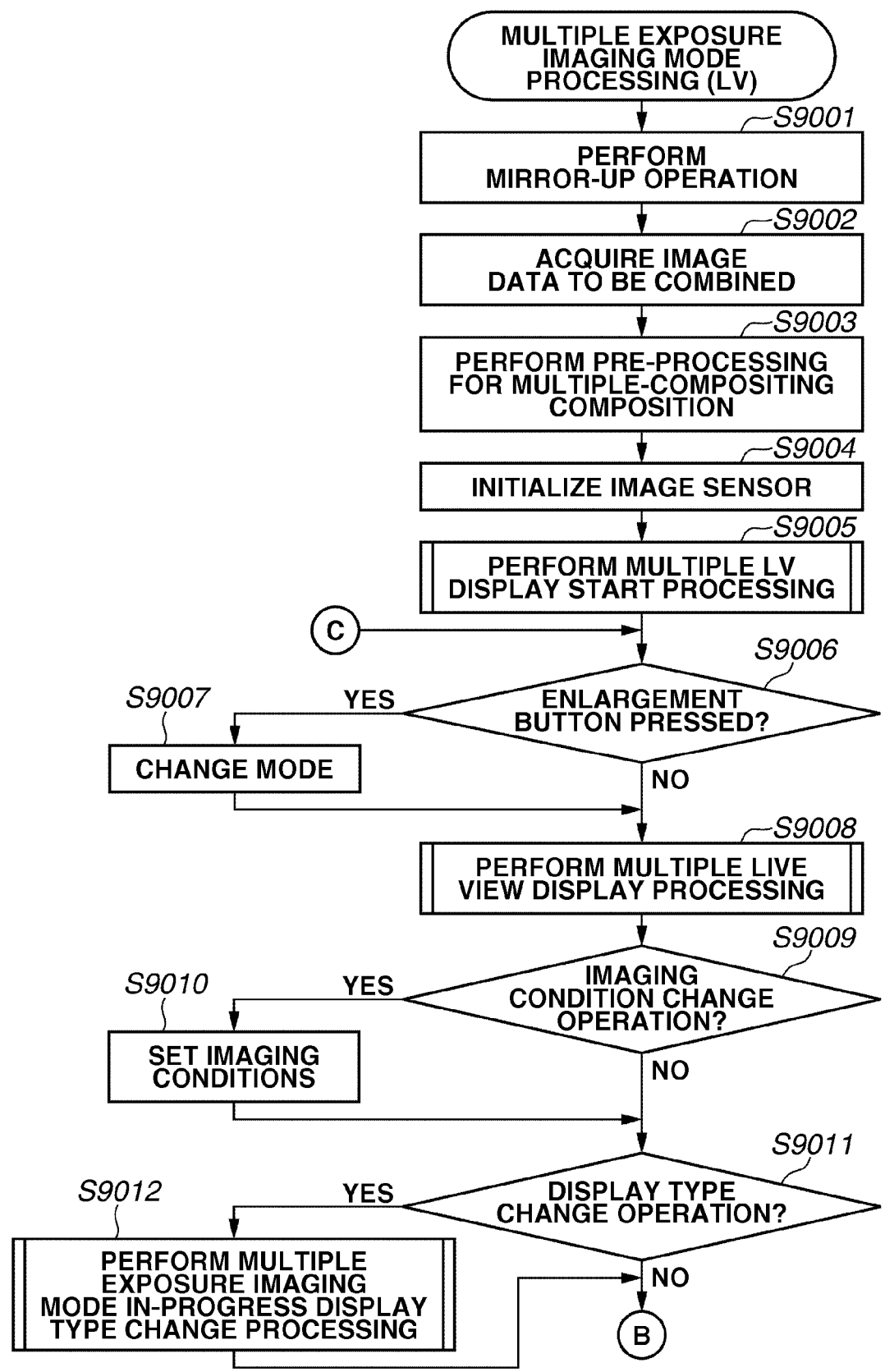
FIG. 9 is a flowchart illustrating multiple-exposure imaging mode processing (LV) that can be performed by the digital camera 100 according to an exemplary embodiment of the present invention.
Figures 10, 10A, 10B:
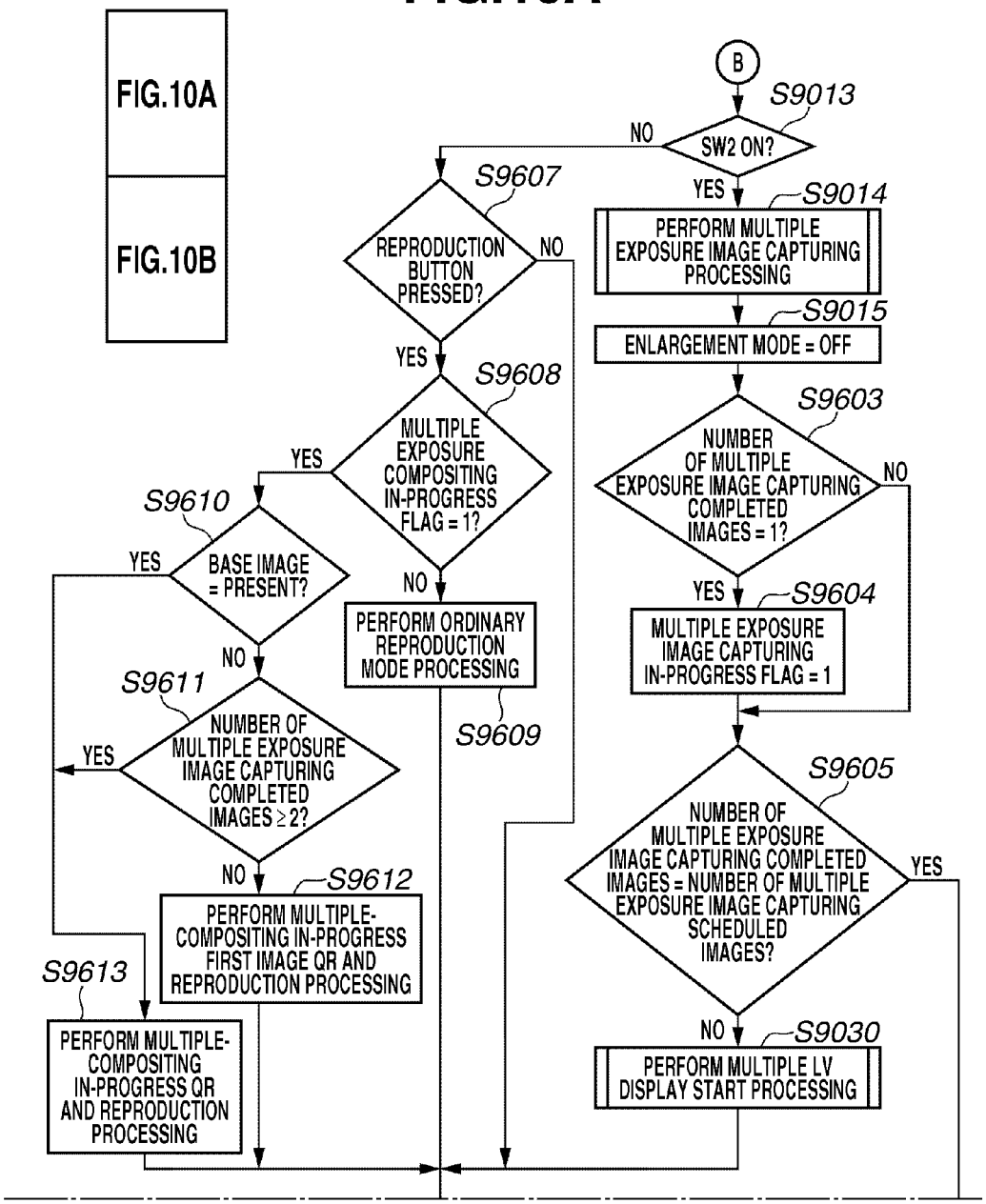
FIG. 10 (10A+10B) is a flowchart illustrating the multiple-exposure imaging mode processing (LV) that can be performed by the digital camera 100 according to an exemplary embodiment of the present invention.

FIG. 9 and FIG. 10 are flowcharts illustrating the multiple-exposure imaging mode processing (LV) in the live view, which is performed in step S512 illustrated in FIG. 5 or in step S630 illustrated in FIG. 6. To realize the processing illustrated in FIG. 9 and FIG. 10, the microcomputer 123 executes a program loaded into the system memory 132 from the non-volatile memory 130.

In step S9001, the microcomputer 123 causes the mirror driving circuit 107 to perform a mirror-up operation to move the main mirror 105 to the upper position to guide the light flux of object light directly toward the image sensor 112. Further, the microcomputer 123 causes the shutter driving circuit 111 to open the shutter 110.

In step S9002, the microcomputer 123 acquires image data to be multiple-composited with a through image. If multiple development data stored in the buffer memory 122 is available, the microcomputer 123 can acquire the multiple development data stored in the buffer memory 122 as the image data to be combined. The multiple development data is the data obtained by multiple-compositing the images (including a base image if the base image is present) having been obtained at this moment in a one-set multiple-exposure imaging operation.

If there is not any multiple development data stored in the buffer memory 122, the microcomputer 123 can acquire development data stored in the buffer memory 122 as the image data to be combined.

If none of the multiple development data and the development data is present in the buffer memory 122, the microcomputer 123 can acquire a base image from the recording medium 120 as the image data to be combined if the base image is set. If none of the multiple development data, the development data, and the base image is present, the microcomputer 123 cannot acquire any image data to be combined because of the absence of an image that can be multiple-composited with a through image.

In step S9003, the microcomputer 123 performs pre-processing on the image data to be combined (i.e., the data having been acquired in step S9002) for the multiple-compositing processing. The pre-processing is, for example, the above-described processing for enhancing the precision of the image data.

Further, in the live view display operation, the microcomputer 123 performs a full-screen (direct) multiple display on the display device 118 or on an external monitor via the external interface 121. Therefore, the microcomputer 123 resizes the image data to be combined in accordance with the number of required pixels. Thus, it is feasible to prevent the processing load from increasing excessively because of a greater number of pixels to be processed.

In step S9004, the microcomputer 123 supplies electric power to the image sensor 112 and the AD converter 115 when they are in the power save mode, and performs live view initialization settings.

In step S9005, the microcomputer 123 performs multiple LV display start processing (i.e., live view display start processing in the multiple-exposure imaging mode). The multiple LV display start processing is described in detail below with reference to FIG. 13.

In step S9006, the microcomputer 123 determines whether an enlargement button 23 has been pressed. If it is determined that the enlargement button 23 has been pressed (YES in step S9006), the processing proceeds to step S9007. If it is determined that the enlargement button 23 has not been pressed (NO in step S9006), the processing proceeds to step S9008.

In step S9007, the microcomputer 123 changes the enlargement mode in response to the pressing of the enlargement button 23. More specifically, if it is determined that the enlargement button 23 has been pressed (YES in step S9006), the microcomputer 123 refers to the enlargement mode flag stored in the system memory 132, and switches the display mode to the "enlargement mode (five times enlargement)" if the present display mode is the "enlargement mode OFF" (i.e., the enlargement is not performed).

If the present display mode is the "enlargement mode (five times enlargement)", the microcomputer 123 switches the display mode to the "enlargement mode (ten times enlargement)." If the present display mode is the "enlargement mode (ten times enlargement)", the microcomputer 123 switches the display mode to the "enlargement mode OFF."

When the display mode is changed to the "enlargement mode (five times enlargement)", the microcomputer 123 stops the multiple display in the live view display operation and performs a full-screen display of a five times enlarged through image. In the present exemplary embodiment, the full-screen display is a display of a through image having a maximum size comparable to the entire display area. When the display mode is changed to the "enlargement mode (ten times enlargement)", the microcomputer 123 performs a full-screen display of a ten times enlarged through image.

When the display mode is changed to the "enlargement mode OFF" (i.e., when the enlargement is not performed), the microcomputer 123 restarts same size display processing according to the presently set display type Gs. The microcomputer 123 records the changed result (enlargement mode) information as the enlargement mode flag in the system memory 132.

In step S9008, the microcomputer 123 performs multiple live view display processing. The multiple live view display processing is described in detail below with reference to FIG. 11.

In step S9009, the microcomputer 123 determines whether the imaging condition change operation has been performed. If it is determined that the imaging condition change operation has been performed (YES in step S9009), then in step S9010, the microcomputer 123 performs imaging condition setting to change the imaging conditions according to the user operation.

The imaging conditions that can be changed according to a user operation include at least one of shutter speed (Tv value), diaphragm value (Av value), exposure correction, ISO sensitivity, and white balance. The imaging conditions changeable according to a user operation are different depending on the imaging mode having been set using the imaging mode dial 14.

In step S9011, the microcomputer 123 determines whether the information display button 16 has been pressed to change the display type. If it is determined that the information display button 16 has been pressed (YES in step S9011), then in step S9012, the microcomputer 123 performs multiple-exposure imaging mode in-progress display type change processing. The multiple-exposure imaging mode in-progress display type change processing is described in detail below with reference to FIG. 14.

Subsequently, in step S9013 of FIG. 10, the microcomputer 123 determines whether the switch SW2 is ON. If it is determined that the switch SW2 is ON (YES in step S9013), the processing proceeds to step S9014. If it is determined that the switch SW2 is not ON (NO in step S9013), the processing proceeds to step S9607.

In step S9014, the microcomputer 123 performs multiple-exposure image capturing processing. The multiple-exposure image capturing processing is similar to the processing performed in step S602 illustrated in FIG. 6 and the processing described with reference to FIG. 7. The main imaging operation is performed through the processing in step S9014. The microcomputer 123 increments the number of multiple-exposure image capturing completed images by one.

In step S9015, the microcomputer 123 initializes the enlargement mode flag stored in the system memory 132 to OFF. Thus, the microcomputer 123 stops the enlargement display using only the through image if the live view display operation is performed in the enlargement mode before performing the multiple-exposure image capturing processing in step S8007. Then, the microcomputer 123 starts same size display processing according to the presently set display type Gs.

Processing to be performed in step S9603 and step S9604 is similar to the above-described processing performed in step S603 and step S604 illustrated in FIG. 6, and therefore the description thereof is not repeated.

In step S9605, the microcomputer 123 determines whether the number of multiple-exposure image capturing completed images has become equal to the number of multiple-exposure image capturing scheduled images. If it is determined that the number of multiple-exposure image capturing completed images is equal to the number of multiple-exposure image capturing scheduled images (YES in step S9605), the processing proceeds to step S9606. If it is determined that the number of multiple-exposure image capturing completed images is not equal to the number of multiple-exposure image capturing scheduled images (NO in step S9605), the processing proceeds to step S9030.

In step S9606, the microcomputer 123 performs storage and termination processing. The storage and termination processing to be performed in step S9606 is similar to the above-described processing performed in step S606 illustrated in FIG. 6.

When the storage and termination processing is completed, the processing proceeds to step S9020. The microcomputer 123 performs live view display start processing that follows the completion of the multiple-exposure imaging operation. The live view display start processing that follows the completion of the multiple-exposure imaging operation is described in detail below with reference to FIG. 15.

When the live view display start processing that follows the completion of the multiple-exposure imaging operation is completed, the microcomputer 123 terminates the multiple-exposure imaging mode processing (LV). The processing proceeds to the above-described step S502 illustrated in FIG. 5.

On the other hand, if it is determined that the number of multiple-exposure image capturing completed images is not equal to the number of multiple-exposure image capturing scheduled images (NO in step S9605), then in step S9030, the microcomputer 123 performs multiple LV display start processing to restart the live view display having been interrupted in the main imaging operation. The multiple LV display start processing is similar to the above-described processing performed in step S9005, and is described in detail below with reference to FIG. 13.

Processing to be performed in step S9607 to step S9616 and processing to be performed in step S9617 to step S9620 are similar to the processing performed in step S607 to step S616 and the processing performed in step S617 to step S620 illustrated in FIG. 6, respectively, and therefore the descriptions thereof are not repeated.

If the storage and termination processing in step S9616 and step S9620 is completed, then in step S9031 and step S9032, the microcomputer 123 performs live view display start processing that follows the completion of the multiple-exposure imaging operation. The live view display start processing that follows the completion of the multiple-exposure imaging operation is similar to the processing performed in step S9020, and is described in detail below with reference to FIG. 15.

In step S9040, the microcomputer 123 refers to the multiple-exposure image capturing necessity setting stored in the system memory 132 or in the nonvolatile memory 130 and determines whether the multiple-exposure image capturing is set to "required." If it is determined that the multiple-exposure image capturing is set to "required" (YES in step S9040), the processing proceeds to step S9041. If it is determined that the multiple-exposure image capturing is set to "not required" (NO in step S9040), the microcomputer 123 terminates the multiple-exposure imaging mode processing (LV). Then, the processing proceeds to the above-described step S502 illustrated in FIG. 5.

In step S9041, the microcomputer 123 determines whether a live view display termination instruction has been received. More specifically, the microcomputer 123 determines whether the live view button 27 has been pressed.

If it is determined that the live view button 27 has been pressed (i.e., when the live view display termination instruction has been received) (YES in step S9041), the processing proceeds to step S9042. The microcomputer 123 causes the mirror driving circuit 107 to perform a mirror-down operation to return the main mirror 105 to the home (ordinary) position so that the light flux can be reflected toward the finder. Then, the processing proceeds to step S600 illustrated in FIG. 6. If it is determined that the live view button 27 has not been pressed (NO in step S9041), the processing proceeds to step S9006 illustrated in FIG. 9. The microcomputer 123 continues the multiple-exposure imaging mode processing (LV).

Figure 11:
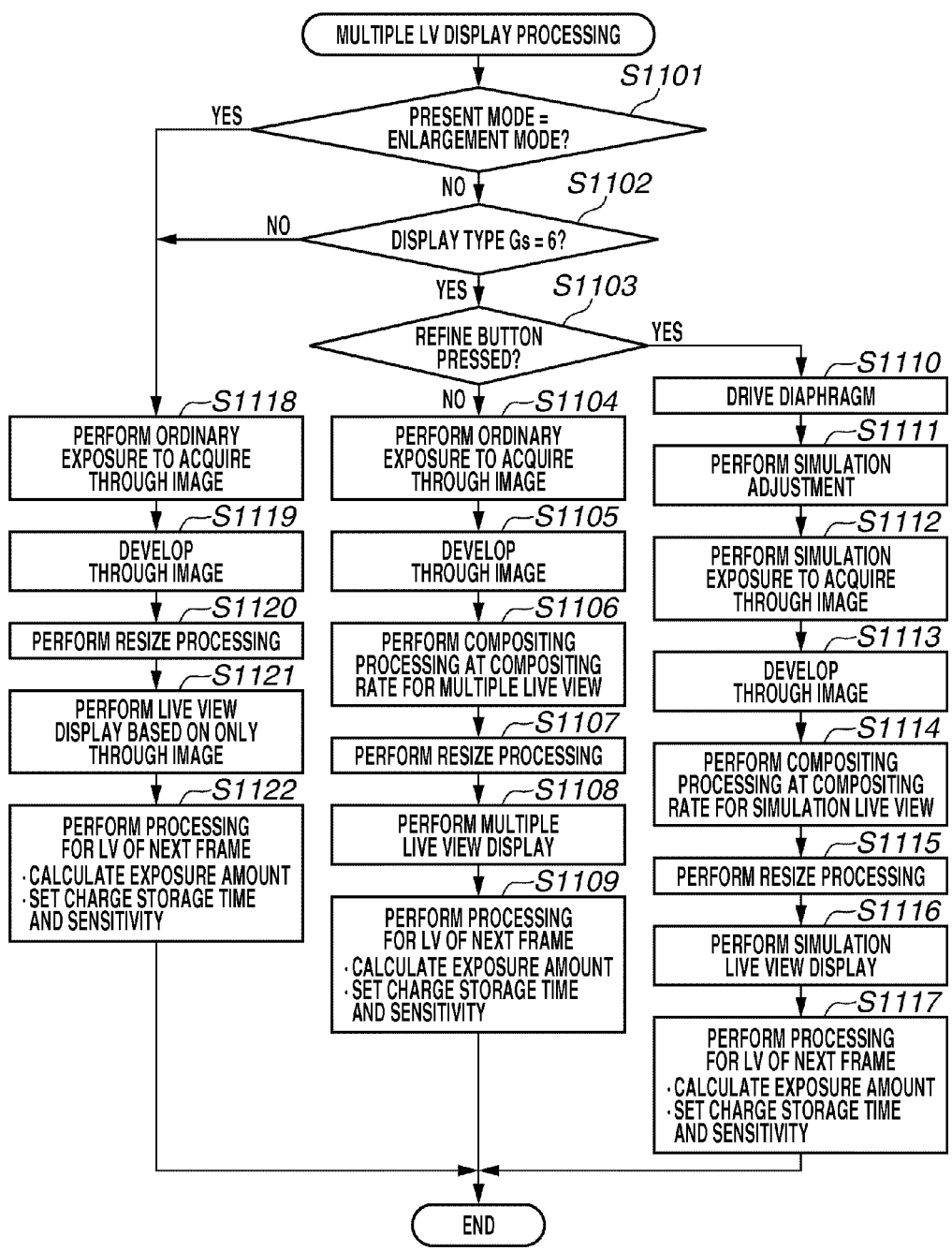
FIG. 11 is a flowchart illustrating multiple live view display processing that can be performed by the digital camera 100 according to an exemplary embodiment of the present invention.

FIG. 11 is a flowchart illustrating the multiple live view display processing to be performed in the above-described step S9008 illustrated in FIG. 9. To realize the processing illustrated in FIG. 11, the microcomputer 123 executes a program loaded into the system memory 132 from the non-volatile memory 130.

Figure 12A:
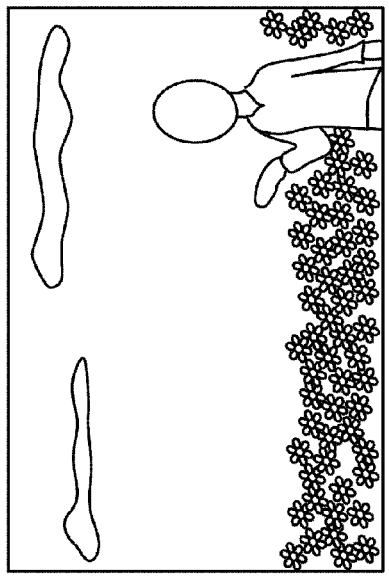
FIGS. 12A to 12D illustrate display examples of the multiple live view display processing.
Figure 12B:
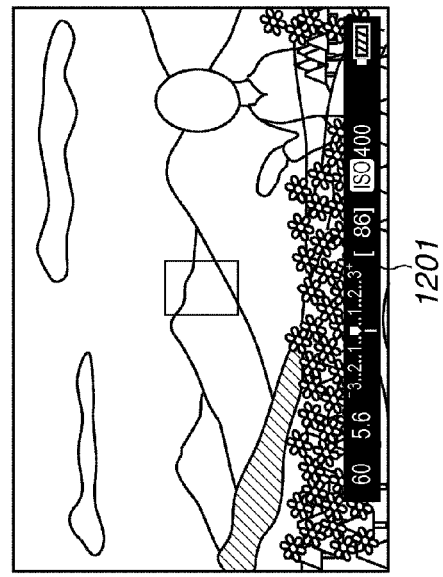

FIG. 12A illustrates an example of the image data to be combined (i.e., the data acquired in step S9002). FIG. 12B illustrates an example of the through image. In the multiple live view display processing, the microcomputer 123 displays a composite image obtained by multiple-compositing the image data to be combined illustrated in FIG. 12A with the through image illustrated in FIG. 12B at a compositing rate that is variable depending on whether to perform the simulated live view.

When the image data to be combined illustrated in FIG. 12A and the through image illustrated in FIG. 12B are displayed on the display device 118, the microcomputer 123 can additionally superimpose various information on the displayed image according to the display type Gs.

In step S1101, the microcomputer 123 determines whether the present mode is the enlargement mode with reference to the enlargement mode flag stored in the system memory 132. If it is determined that the present mode is the enlargement mode, i.e., the "enlargement mode (five times enlargement)" or the "enlargement mode (ten times enlargement)" (YES in step S1101), the processing proceeds to step S1118. If it is determined that the present mode is not the enlargement mode, more specifically when the present mode is the "enlargement mode OFF" (i.e., when the enlargement is not required) (NO in step S1101), the processing proceeds to step S1102.

In step S1102, the microcomputer 123 determines whether the present display type Gs is "6" (i.e., the multiple live view display). If it is determined that the present display type Gs is "6" (YES in step S1102), the processing proceeds to step S1103. If it is determined that the present display type Gs is not "6" (NO in step S1102), the processing proceeds to step S1118.

In step S1103, the microcomputer 123 determines whether the preview button 15 is currently pressed. If it is determined that the preview button 15 is currently pressed (YES in step S1103), the processing proceeds to step S1110. If it is determined that the preview button 15 is not pressed (more specifically when the preview button 15 is released) (NO in step S1103), the processing proceeds to step S1104.

In step S1104, the microcomputer 123 controls the image sensor 112 and the diaphragm driving circuit 104 to perform an ordinary exposure operation that is required to acquire a through image. In the ordinary exposure operation for the acquisition of a through image, regardless of a diaphragm value having been set for the main imaging operation to be triggered by the switch SW2, the microcomputer 123 causes the diaphragm driving circuit 104 to open the diaphragm 103 (i.e., minimize the diaphragm value) in such a way as to decrease the depth of field to allow a user easily to confirm the in-focus state in the live view display operation.

The microcomputer 123 performs the exposure operation while adjusting the charge storage time and sensitivity (ISO sensitivity) of the image sensor 112 to obtain the brightness easy to view.

In step S1105, the microcomputer 123 performs development processing on a through image having been acquired through the exposure operation performed in step S1104.

In step S1106, the microcomputer 123 multiple-composites the through image developed in step S1105 with the above-described image data to be combined having been pre-processed in step S9003 illustrated in FIG. 9 at a compositing rate for the multiple live view. The compositing rate for the multiple live view is a compositing rate defined by the above-described formula (5). More specifically, the compositing rate can be defined using the compositing rate M (M is equal to or greater than 0.5) of the through image and the compositing rate (1−M) of the image data to be combined.

Thus, it becomes feasible to improve the visibility of a through image to be captured compared to a previously captured image (i.e., image data to be combined) in the multiple live view display in which the through image is multiple-composited with the previously captured image.

In step S1107, the microcomputer 123 resizes the multiple-composite image obtained by combining the through image with the previously captured image (i.e., the image data to be combined) in step S1106, with reference to the output destination (e.g., the display device 118 or the external monitor). For example, when the output destination is the display device 118 of the camera, the microcomputer 123 resizes the multiple-composite image to have a horizontal width comparable to 720 pixels and a vertical width comparable to 480 pixels.

When the output destination is an external monitor of hi-vision, the microcomputer 123 resizes the multiple-composite image to have a horizontal width comparable to 1620 pixels and a vertical width comparable to 1080 pixels. Further, it is useful to trim the upper and lower portions of the image and resize the trimmed image to have a horizontal width comparable to 1920 pixels and a vertical width comparable to 1080 pixels.

Figure 12C:
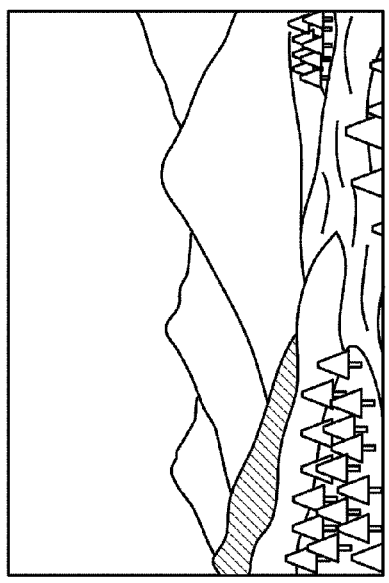

In step S1108, the microcomputer 123 performs multiple live view display to display the multiple-composite image resized in step S1107 on the display device 118 or on the external monitor. FIG. 12C illustrates a display example of the multiple live view display, although the illustrated example is a simplified example and does not include any information display according to the display type "6" (i.e., the multiple live view display) illustrated in FIG. 16.

In FIG. 12C, the through image is displayed clearly compared to the previously captured image, as an effect of the above-described compositing processing in step S1106. Thus, a user can easily recognize the through image.

In step S1109, the microcomputer 123 calculates an exposure amount to be required in the acquisition of a through image for the next frame based on the through image acquired in step S1104. The microcomputer 123 sets charge storage time and sensitivity of the image sensor 112 while fixing the diaphragm value to "open."

On the other hand, if it is determined that the preview button 15 is currently pressed (YES in step S1103), the processing proceeds to step S1110. The microcomputer 123 performs a simulation display of a multiple-composite image to be actually generated in the main imaging operation.

More specifically, in step S1110, the microcomputer 123 causes the diaphragm driving circuit 104 to drive the diaphragm 103 to realize a diaphragm value (i.e., a diaphragm value having been set by a user or a diaphragm value automatically calculated based on a program diagram), which is one of the imaging conditions having been set for the main imaging operation triggered by the switch SW2.

When the diaphragm is driven to have a preset diaphragm value for the main imaging operation, it is feasible to equalize the depth of field for a through image with the depth of field for an image to be captured in the main imaging. Thus, a user can confirm the degree of defocus.

In step S1111, the microcomputer 123 performs a simulation adjustment. More specifically, the microcomputer 123 fixes the preset diaphragm value for the main imaging operation and adjusts the charge storage time and the sensitivity so as to obtain the brightness similar to the brightness of an image to be captured in the main imaging operation performed based on present imaging conditions having been set for the main imaging operation.

First, the microcomputer 123 sets the charge storage time to be a value comparable to the shutter speed having been set as one of the imaging conditions within the range of the charge storage time for the acquisition of a through image. Further, the microcomputer 123 adjusts the sensitivity to compensate an amount that cannot be adjusted by the setting of the charge storage time.

For example, in a case where the digital camera 100 updates the through image at intervals of ⅟30 second, it is impossible to set the charge storage time for the through image acquisition to be longer than ⅟30 second. Accordingly, when the shutter speed (as one of the imaging conditions) is set to be longer than ⅟30 second, the microcomputer 123 sets a settable longest time as the charge storage time for the through image acquisition, and increases the sensitivity in such a way as to compensate an insufficient amount.

In step S1112, the microcomputer 123 performs a simulation exposure operation. More specifically, the microcomputer 123 performs an exposure operation based on the diaphragm value, the charge storage time, and the sensitivity having been set in step S1110 and step S1111 to acquire a through image.

In step S1113, the microcomputer 123 performs development processing on the through image acquired through the exposure operation performed in step S1112.

In step S1114, the microcomputer 123 multiple-composites the through image developed in step S1113 with the image data to be combined (i.e., the data pre-processed in the above-described step S9003 illustrated in FIG. 9) at a compositing rate for the simulated live view.

The compositing rate for the simulated live view is a compositing rate defined by the above-described formula (6) or (7). A user can confirm a multiple-composite image to be generated when the main imaging operation is performed based on the present imaging conditions, while viewing the simulated live view display before starting the main imaging operation.

In step S1115, the microcomputer 123 resizes the multiple-composite image obtained by combining the through image and the previously captured image (i.e., the image data to be combined) in step S1114, according to the output destination (i.e., the display device 118 or the external monitor).

Figure 12D:
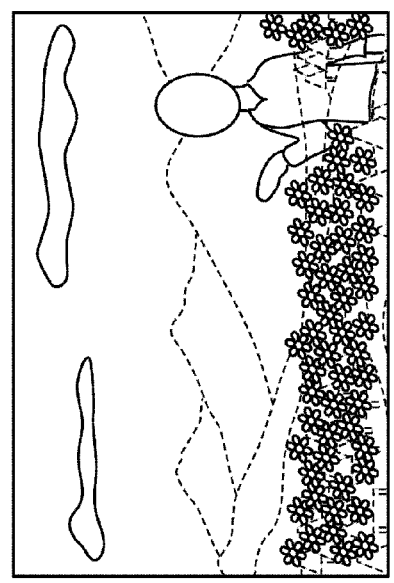

In step S1116, the microcomputer 123 performs simulated live view display to display the multiple-composite image having been resized in step S1115 on the display device 118 or on the external monitor. FIG. 12D illustrates a display example of the simulated live view. The image illustrated in FIG. 12D reflects the imaging conditions and the setting state of the automatic exposure adjustment function. Therefore, the visibility of the through image is not so high. However, it is useful to confirm a multiple-composite image to be generated in the main imaging operation.

Further, the display example illustrated in FIG. 12D includes a dialog 1201 that notifies a user of imaging conditions presently set.

The dialog 1201 illustrated in FIG. 12D includes a plurality of view fields for shutter speed (Tv value), diaphragm value (Av value), exposure correction, number of remaining images that can be captured, ISO sensitivity, and remaining battery amount, which are disposed in this order from the left to the right. While viewing the dialog 1201 and a display of the simulated live view, a user can confirm the effects of the imaging conditions and can change the imaging conditions (in the above-described processing in step S9009 and step S9010).

In step S1117, the microcomputer 123 calculates an exposure amount to be used in the acquisition of a through image for the next frame based on the through image acquired in step S1112. The microcomputer 123 sets charge storage time and sensitivity of the image sensor 112 while setting the diaphragm value to the preset diaphragm value (i.e., one of the imaging conditions)."

Processing to be performed in step S1118, step S1119, and step S1120 (i.e., the processing to be performed in the enlargement mode or in the live view mode using only the through image) is similar to the processing performed in step S1104, step S1105, and step S1107, respectively, and therefore the description thereof is not repeated.

In step S1121, the microcomputer 123 does not perform the multiple-compositing processing and displays only the through image resized in step S1120 on the display device 118 or on the external monitor. However, the microcomputer 123 superimposes various information and icons according to the presently selected display type Gs.

Processing to be performed in step S1122 is similar to the processing performed in step S1109 and therefore the description thereof is not repeated.

As described above, in the enlargement mode or in the live view mode using only the through image, the microcomputer 123 does not perform the multiple-compositing processing and displays only the through image in the live view operation. To obtain similar effects, the microcomputer 123 can set the compositing rate between a through image and an already captured multiple development image to 100:0, and performs the processing in step S1104 to step S1109.

When the processing in step S1109, step S1117, and step S1122 is completed, the processing proceeds to step S9009 illustrated in FIG. 9.

Figure 13:
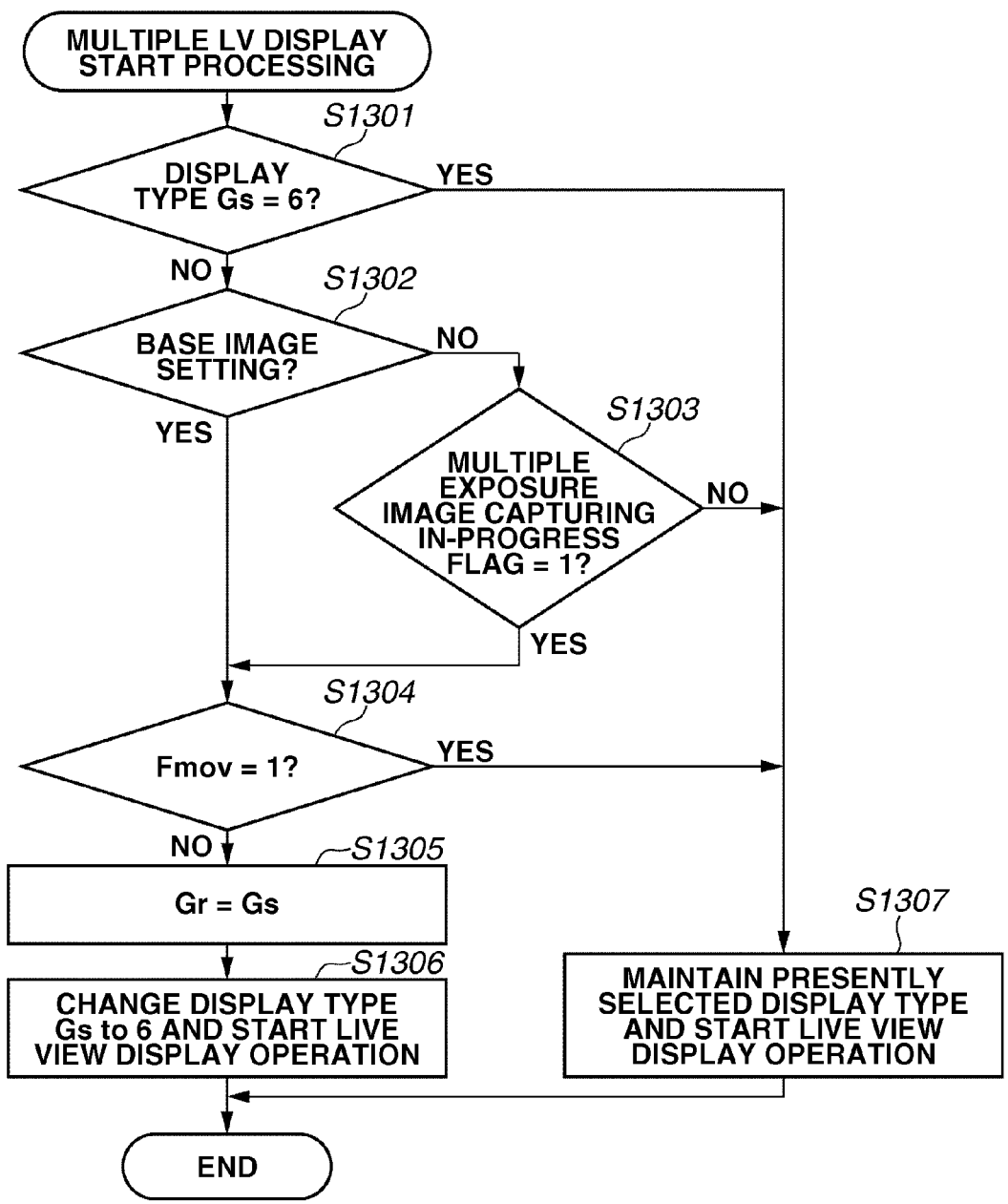
FIG. 13 is a flowchart illustrating multiple LV display start processing that can be performed by the digital camera 100 according to an exemplary embodiment of the present invention.

FIG. 13 is a flowchart illustrating the multiple LV display start processing to be performed in the above-described step S9005 illustrated in FIG. 9 and in step S9030 illustrated in FIG. 10. To realize the processing illustrated in FIG. 13, the microcomputer 123 executes a program loaded into the system memory 132 from the nonvolatile memory 130.

In step S1301, the microcomputer 123 determines whether the present display type Gs stored in the system memory 132 is "6" (i.e., the multiple live view display is in progress). If it is determined that the present display type Gs is "6" (YES in step S1301), the processing proceeds to step S1307. If it is determined that the present display type Gs is not "6" (NO in step S1301), the processing proceeds to step S1302.

In step S1302, the microcomputer 123 determines whether the base image setting is present. If it is determined that the base image setting is present (YES in step S1302), the processing proceeds to step S1304. If it is determined that the base image setting is not present (NO in step S1302), the processing proceeds to step S1303.

In step S1303, the microcomputer 123 determines whether the multiple-exposure image capturing in-progress flag is 1. If it is determined that the multiple-exposure image capturing in-progress flag is 1 (YES in step S1303), the processing proceeds to step S1304. If it is determined that the multiple-exposure image capturing in-progress flag is not 1 (NO in step S1303), the processing proceeds to step S1307.

The multiple-exposure image capturing in-progress flag turns into 1 when the number of multiple-exposure image capturing completed images becomes equal to one, as described in step S603 and step S604 illustrated in FIG. 6. More specifically, if the multiple-exposure image capturing in-progress flag is 1, it means that the number of multiple-exposure image capturing completed images is one or more.

In step S1304, the microcomputer 123 determines whether a flag Fmov is 1. The flag Fmov indicates whether the display type has been changed from "6" (i.e., the multiple live view display) to other display type according to a user operation. If it is determined that the flag Fmov is 1 (YES in step S1304), the processing proceeds to step S1307. If it is determined that the flag Fmov is not 1 (NO in step S1304), the processing proceeds to step S1305. When the flag Fmov is 1, it means that the multiple live view display has been already performed in the present one-set multiple-exposure imaging operation.

In step S1305, the microcomputer 123 sets the present display type Gs as Gr, and stores (records) the set information in the system memory 132.

In step S1306, the microcomputer 123 automatically changes the display type Gs to "6" (i.e., the multiple live view display) and starts a live view display operation.

On the other hand, in step S1307, the microcomputer 123 performs a live view display operation while holding the present display type Gs. More specifically, the microcomputer 123 does not change the display type.

As described above, when the base image is present or when the number of multiple-exposure image capturing completed images becomes one or more and the multiple live view display is not yet performed in the present one-set multiple-exposure imaging operation (NO in step S1304), the microcomputer 123 automatically changes the display type to the multiple live view display in step S1306. When no base image is present and the number of multiple-exposure image capturing completed images is 0, it means that there is not any image to be multiple-composited with a through image in the multiple live view display.

In this state, if the microcomputer 123 starts the multiple live view display (i.e., the display type "6"), a multiple live view image cannot be displayed. In such a case, selecting the display type "6" is meaningless, and the information having been displayed according to the pre-change display type cannot be viewed. Further, even though the information to be displayed in the multiple live view display (i.e., the display type "6") is displayed, a user may be confused because the displayed image is not the multiple-composited one.

On the other hand, according to the processing illustrated in FIG. 13, even when a user sets the multiple-exposure image capturing necessity setting to "required" and the microcomputer 123 starts the multiple-exposure imaging mode processing (LV), the microcomputer 123 does not change the display type if there is not any image to be superimposed on a through image. Thus, it is useful to prevent the information to be displayed from being changed meaninglessly.

Further, in a case where an image to be superimposed on a through image is initially present as a base image, or in a case where no base image is present and an image to be multiple-composited is obtained in the initial imaging operation of the multiple-exposure image capturing, the microcomputer 123 automatically changes the display type and starts a multiple live view display operation. Thus, users are not required to manually select a display type that is suitable for the multiple-exposure image capturing.

Figure 14:
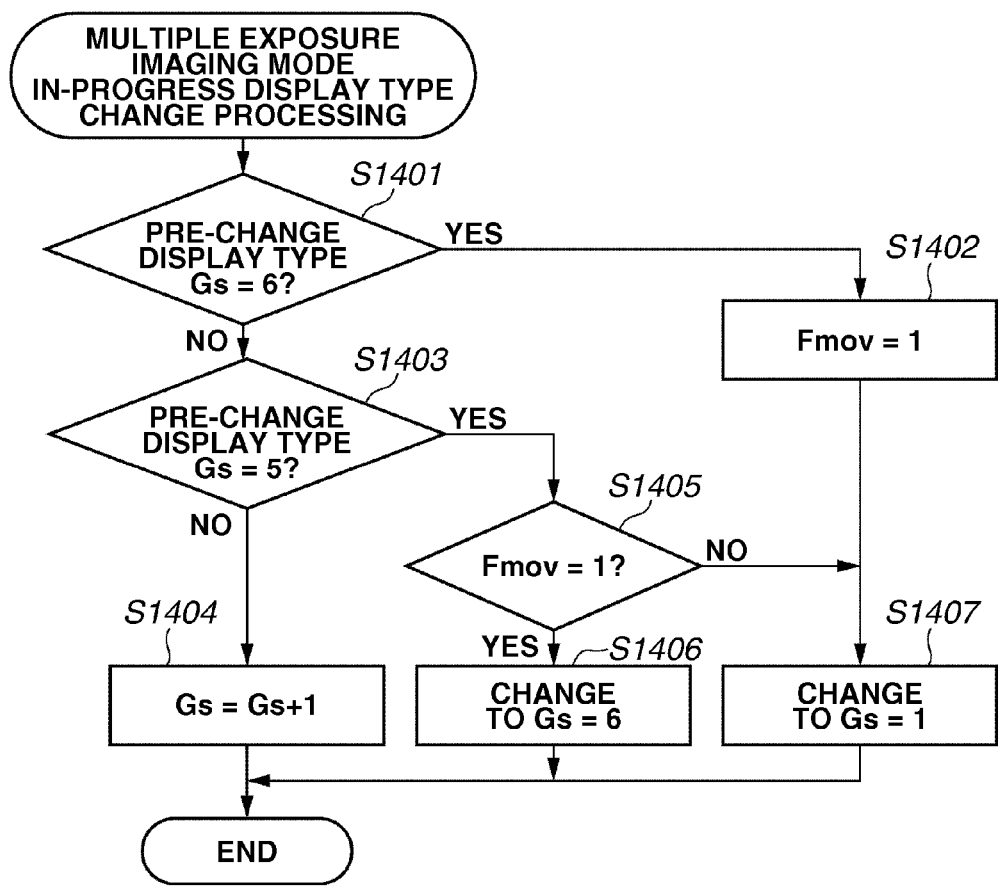
FIG. 14 is a flowchart illustrating display type change processing that can be performed by the digital camera 100 during a multiple-exposure imaging mode according to an exemplary embodiment of the present invention.

FIG. 14 is a flowchart illustrating an example of the multiple-exposure imaging mode in-progress display type change processing to be performed in step S9012 illustrated in FIG. 9. To realize the processing illustrated in FIG. 14, the microcomputer 123 executes a program loaded into the system memory 132 from the nonvolatile memory 130.

In step S1401, the microcomputer 123 determines whether a pre-change display type Gs is "6" (i.e., the multiple live view display). If it is determined that the pre-change display type is "6" (YES in step S1401), the processing proceeds to step S1402. If it is determined that the pre-change display type is not "6" (NO in step S1401), the processing proceeds to step S1403.

In step S1402, the microcomputer 123 sets the flag Fmov to 1 (i.e., Fmov=1) and records information that the display type has been changed from the multiple live view display to other display type according to a user operation.

In step S1403, the microcomputer 123 determines whether the pre-change display type Gs is "5" (i.e., the leveling instrument display). If it is determined that the pre-change display type Gs is not "5" (NO in step S1403), the processing proceeds to step S1404. The microcomputer 123 increments the pre-change display type Gs by one to select the next display type. If it is determined that the pre-change display type Gs is "5" (YES in step S1403), the processing proceeds to step S1405.

In step S1405, the microcomputer 123 determines whether the flag Fmov is 1. The result "Fmov=1" indicates that the display type Gs has ever been set to "6" in the present multiple-exposure image capturing processing.

Further, as described above with reference to FIG. 13, an automatic control is performed to initially set the display type to Gs=6 after the switching to the display type Gs=6 is allowed. Therefore, if the present state is a state where the display type can be set to Gs=6, the flag Fmov is constantly 1. More specifically, determining whether the flag Fmov is 1 in step S1405 enables the microcomputer 123 to determine whether the present operational state is a state where the display type can be set to Gs=6.

If it is determined that the flag Fmov is 1 (YES in step S1405), the processing proceeds to step S1406. If it is determined that the flag Fmov is not 1 (NO in step S1405), the processing proceeds to step S1407.

In step S1406, the microcomputer 123 changes the display type Gs to "6." Thus, the switching pattern illustrated in FIG. 17B can be realized.

In step S1407, the microcomputer 123 changes the display type Gs to "1."

Figure 15:
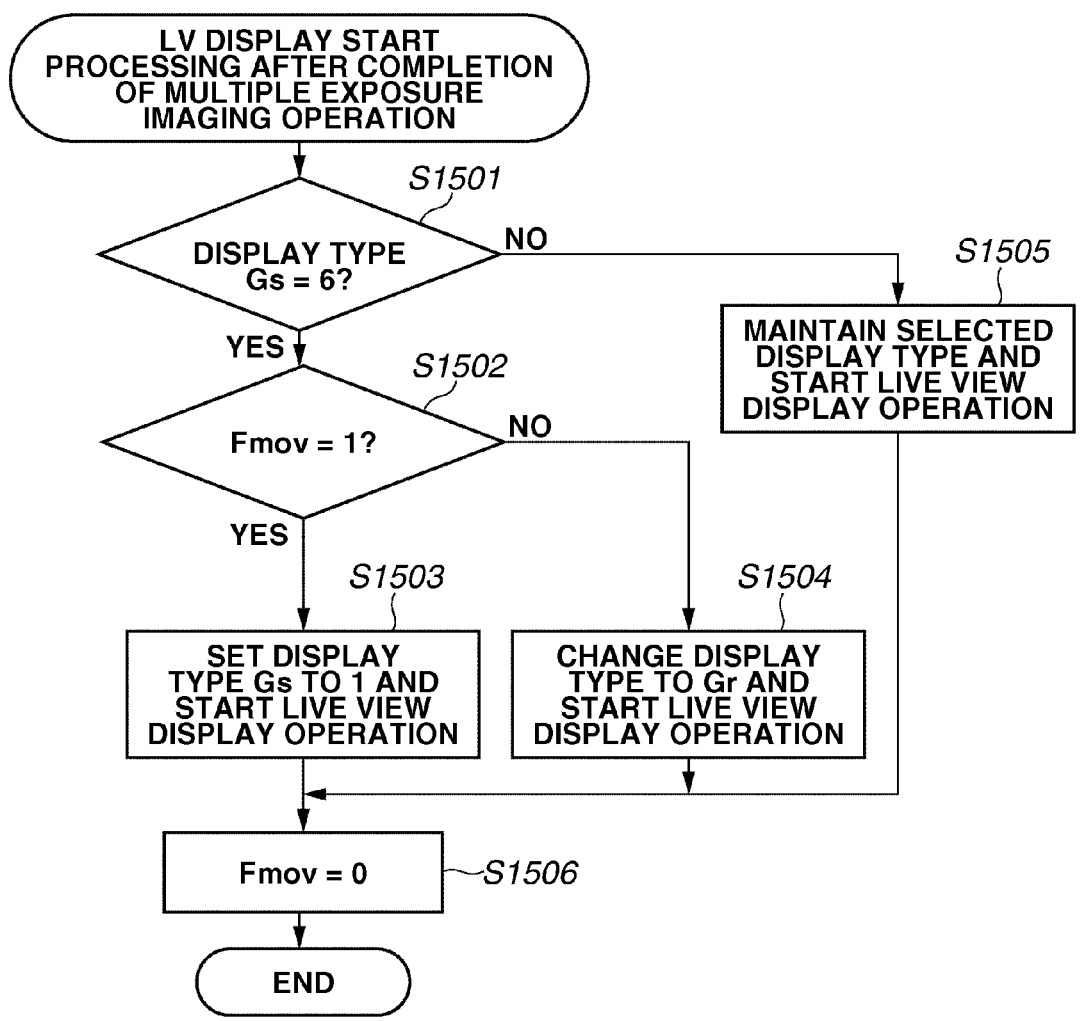
FIG. 15 is a flowchart illustrating LV display start processing that follows the completion of a multiple-exposure imaging operation, which can be performed by the digital camera 100 according to an exemplary embodiment of the present invention.

FIG. 15 is a flowchart illustrating an example of the LV display start processing that follows the completion of the multiple-exposure imaging operation (i.e., the processing to be performed in the above-described step S9020, step S9031, and step S9032 illustrated in FIG. 9). To realize the processing illustrated in FIG. 15, the microcomputer 123 executes a program loaded into the system memory 132 from the nonvolatile memory 130.

In step S1501, the microcomputer 123 determines whether the present display type Gs is "6." If it is determined that the present display type Gs is "6" (YES in step S1501), the processing proceeds to step S1502. If it is determined that the present display type Gs is not "6" (NO in step S1501), the processing proceeds to step S1505.

In step S1502, the microcomputer 123 determines whether the flag Fmov is 1. If it is determined that the flag Fmov is 1 (YES in step S1502), the processing proceeds to step S1503. If it is determined that the flag Fmov is not 1 (NO in step S1502), the processing proceeds to step S1504.

In step S1503, the microcomputer 123 sets the display type Gs to "1" and starts a live view display operation. In this case, although a user wants to deselect the presently set multiple live view display, the user cannot determine whether to select the display type Gr having been initially set in the multiple-exposure imaging mode processing (LV) or the display type having been selected immediately before starting the present multiple live view display operation. Therefore, the microcomputer 123 selects the predetermined display type "1."

In step S1504, the microcomputer 123 changes the display type to the stored type Gr and starts the live view display operation. Thus, users are not required to perform an operation to return the display type to the originally selected one, to re-select the display type having been set immediately before the display type is automatically changed to the multiple live view display.

In step S1505, the microcomputer 123 maintains the presently selected display type and starts the live view display operation.

As described above, according to the processing illustrated in FIG. 15, if the display type is the multiple live view display (i.e., the display type "6"), the microcomputer 123 automatically deselects the multiple live view display upon terminating the multiple-exposure image capturing and sets an appropriate display type according to the prior user operation state.

As described above, in a case where the multiple-exposure imaging mode is set and an image that can be multiple-composited with a through image is present, the system according to the present invention automatically sets an information display according to the display type dedicated to the multiple-exposure imaging mode. Thus, it is possible to select the display type dedicated to the multiple-exposure imaging mode, at meaningful timing for a user, without requiring any user operation.

Further, when the multiple-exposure imaging mode setting is deselected, the system according to the present invention automatically changes the display type to other display type from the display type dedicated to the multiple-exposure imaging mode. Thus, it is possible to set an appropriate display type immediately after the information display according to the display type dedicated to the multiple-exposure imaging mode becomes inappropriate, without requiring any user operation.

As described above, the system according to the present invention can perform information display appropriately considering the situation in the multiple-exposure imaging operation.

The system according to the above-described exemplary embodiment performs multiple-compositing processing using development data. Alternatively, it is feasible to perform the multiple-compositing processing using RAW image data (i.e., pre-development data).

Further, a single hardware configuration having the capability of realizing the control of the microcomputer 123 is employable. To the contrary, a plurality of hardware configurations that can cooperatively perform the entire control of the apparatus is employable.

Further, the present invention is not limited to the above-described exemplary embodiment. The system according to the present invention can be modified in various ways without departing the gist of the present invention. Further, the above-described exemplary embodiment is a mere embodiment of the present invention. It is possible to appropriately combine a plurality of exemplary embodiments.

The present invention has been described based on an example of a digital camera in the above-described exemplary embodiment. The present invention is not limited to the above-described example and is applicable to any imaging apparatus including an imaging unit. More specifically, the present invention is applicable to any one of a digital camera, a digital video camera, a camera-equipped personal computer, a PDA, a camera-equipped portable telephone terminal, a camera-equipped music player, a camera-equipped game machine, and a camera-equipped electronic book reader.

The present invention can be realized by executing the following processing. More specifically, the processing includes supplying a software program that can realize the functions of the above-described exemplary embodiment to a system or an apparatus via a network or using an appropriate storage medium, and causing a computer (or a central processing unit (CPU) or a micro-processing unit (MPU)) of the system or the apparatus to read program codes and execute the readout program. In this case, the program itself and a storage medium that stores the program can constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-101318 filed Apr. 28, 2011, which is hereby incorporated by reference herein in its entirety.

What is claimed is:

1. An imaging apparatus comprising:
an imaging unit configured to capture a through image;
a display type setting unit configured to set any one of a plurality of display types as a display type for an information display to be displayed together with the through image captured by the imaging unit;
a mode setting unit configured to set a multiple-exposure imaging mode; and
a control unit configured to perform a control, when the multiple-exposure imaging mode is set by the mode setting unit and an image to be multiple-composited with the through image can be acquired, so as to change the display type to a display type dedicated to the multiple-exposure imaging mode for displaying at least one of the number of multiple-exposure image capturing scheduled images, the number of multiple-exposure image capturing completed images, the number of images remaining to reach the number of multiple-exposure image capturing scheduled images, and an icon indicating that the multiple-exposure imaging mode is set,
wherein the control unit is configured to perform a control, when the multiple-exposure imaging mode is set by the mode setting unit and an image to be multiple-composited with the through image has not been acquired, so as not to change the display type to the display type dedicated to the multiple-exposure imaging mode.

2. The imaging apparatus according to claim 1, wherein the control unit is configured to hold the display type having been set by the display type setting unit if the multiple-exposure imaging mode is set by the mode setting unit and an image to be multiple-composited with the through image is not present.

3. The imaging apparatus according to claim 1, wherein the control unit is configured to perform a control when an image having been recorded before the mode setting unit sets the multiple-exposure imaging mode is set beforehand as a base image to be multiple-composited with an image to be captured in the multiple-exposure imaging mode, so as to change the display type to the display type dedicated to the multiple-exposure imaging mode when the multiple-exposure imaging mode is set by the mode setting unit, and when the base image is not set and the multiple-exposure imaging mode is set by the mode setting unit, so as not to change the display type to the display type dedicated to the multiple-exposure imaging mode.

4. The imaging apparatus according to claim 3, wherein the control unit is configured to perform a control, when no base image is set, so as to change the display type to the display type dedicated to the multiple-exposure imaging mode in response to a capturing of the first image after the multiple-exposure imaging mode is set by the mode setting unit.

5. The imaging apparatus according to claim 1, wherein the display type dedicated to the multiple-exposure imaging mode is a display type that does not display shutter speed, diaphragm value, exposure correction value, number of remaining images that can be stored in a recording medium, AF type, size of captured image, luminance histogram, and inclination information detectable using a leveling instrument.

6. The imaging apparatus according to claim 1, wherein the control unit is configured to perform a control, when the multiple-exposure imaging mode having been set by the mode setting unit is deselected, so as to change the display type to other display type from the display type dedicated to the multiple-exposure imaging mode.

7. The imaging apparatus according to claim 6, wherein the control unit is configured to perform a control, when the multiple-exposure imaging mode having been set by the mode setting unit is deselected, so as to change the display type to a display type having been set by the display type setting unit before the display type is changed to the display type dedicated to the multiple-exposure imaging mode.

8. The imaging apparatus according to claim 6, wherein the control unit is configured to change the display type to a predetermined display type when the multiple-exposure imaging mode having been set by the mode setting unit is deselected if the display type immediately before the multiple-exposure imaging mode having been set by the mode setting unit is deselected is the display type dedicated to the multiple-exposure imaging mode, and if the display type has ever been changed to a display type different from the display type dedicated to the multiple-exposure imaging mode before the multiple-exposure imaging mode having been set by the mode setting unit is deselected.

9. The imaging apparatus according to claim 6, wherein the control unit is configured to perform a control, when the display type immediately before the multiple-exposure imaging mode having been set by the mode setting unit is deselected is not the display type dedicated to the multiple-exposure imaging mode, so as to hold the display type even when the multiple-exposure imaging mode having been set by the mode setting unit is deselected.

10. An imaging apparatus comprising:
an imaging unit configured to capture a through image;
a display type setting unit configured to set any one of a plurality of display types including a display type dedicated to a multiple-exposure imaging mode as a display type for an information display to be displayed together with the through image captured by the imaging unit;
a mode setting unit configured to set the multiple-exposure imaging mode; and
a control unit configured to perform a control, when the multiple-exposure imaging mode having been set by the mode setting unit is deselected, so as to change the display type to other display type if the display type is the display type dedicated to the multiple-exposure imaging mode, and hold the display type if the display type is not the display type dedicated to the multiple-exposure imaging mode,
wherein the control unit is configured to change the display type to a predetermined display type when the multiple-exposure imaging mode having been set by the mode setting unit is deselected if the display type immediately before the multiple-exposure imaging mode having been set by the mode setting unit is deselected is the display type dedicated to the multiple-exposure imaging mode, and if the display type has ever been changed to a display type different from the display type dedicated to the multiple-exposure imaging mode before the multiple-exposure imaging mode having been set by the mode setting unit is deselected.

11. The imaging apparatus according to claim 10, wherein the control unit is configured to perform a control, when the multiple-exposure imaging mode having been set by the mode setting unit is deselected, so as to change the display type to a display type having been set by the display type setting unit before the display type is changed to the display type dedicated to the multiple-exposure imaging mode.

12. A method for controlling an imaging apparatus that includes an imaging unit, the method comprising:
setting any one of a plurality of display types as a display type for an information display to be displayed together with a through image captured by the imaging unit;
setting a multiple-exposure imaging mode; and
performing a control, when the multiple-exposure imaging mode is set and an image to be multiple-composited with the through image can be acquired, so as to change the display type to a display type dedicated to the multiple-exposure imaging mode for displaying at least one of the number of multiple-exposure image capturing scheduled images, the number of multiple-exposure image capturing completed images, the number of images remaining to reach the number of multiple-exposure image capturing scheduled images, and an icon indicating that the multiple-exposure imaging mode is set,
wherein performing a control, when the multiple-exposure imaging mode is set and an image to be multiple-composited with the through image has not been acquired, so as not to change the display type to the display type dedicated to the multiple-exposure imaging mode.

13. A non-transitory computer readable recording medium storing a computer program that causes a computer to function as each unit of the imaging apparatus described in claim 1.

14. A method for controlling an imaging apparatus that includes an imaging unit, the method comprising:
setting any one of a plurality of display types including a display type dedicated to a multiple-exposure imaging mode as a display type for an information display to be displayed together with a through image captured by the imaging unit;
setting the multiple-exposure imaging mode; and
performing a control, when the multiple-exposure imaging mode is deselected, so as to change the display type to other display type if the display type is the display type dedicated to the multiple-exposure imaging mode, and hold the display type if the display type is not the display type dedicated to the multiple-exposure imaging mode, wherein changing the display type to a predetermined display type when the multiple-exposure imaging mode having been set is deselected if the display type immediately before the multiple-exposure imaging mode having been set is deselected is the display type dedicated to the multiple-exposure imaging mode, and if the display type has ever been changed to a display type different from the display type dedicated to the multiple-exposure imaging mode before the multiple-exposure imaging mode having been set is deselected.

15. A non-transitory computer readable recording medium storing a computer program that causes a computer to function as each unit of the imaging apparatus described in claim 10.

16. An imaging apparatus comprising:
an imaging unit configured to capture a through image;
a display changing unit configured to change a display item to be displayed together with the through image captured by the imaging unit;
a mode setting unit configured to set a mode in a multiple-exposure imaging mode; and
a controlling unit configured to perform a control so that a display item displayed together with the thorough image is to be a predetermined item for multiple-exposure imaging in response to the setting made by the mode setting unit,
wherein, in a case where an image to be multiple-composited with the through image is not acquired, even if the multiple-exposure imaging mode is set by the mode setting unit, the controlling unit doesn't perform the control to display the predetermined display item for multiple-exposure imaging but performs the control to display the predetermined display item for multiple-exposure imaging together with the thorough image in a case where an image to be multiple-composited with the through image is acquired.

17. The imaging apparatus according to claim 16, wherein the predetermined display item for multiple-exposure imaging is at least one of the number of multiple-exposure image capturing scheduled images, the number of multiple-exposure image capturing completed images, the number of images remaining to reach the number of multiple-exposure image capturing scheduled images, and an icon indicating that the multiple-exposure imaging mode is set.

18. The imaging apparatus according to claim 16, further comprising:

a selecting unit configured to select a base image to be multiple-composited with an image to be captured in the multiple-exposure imaging mode from images stored in a recording medium,
wherein, in a case where the base image is not selected by the selecting unit, the predetermined display item for multiple-exposure imaging is not displayed, and in a case where the base image is selected by the selecting unit, the predetermined display item for multiple-exposure imaging is displayed in response to the setting of the multiple-exposure imaging mode set by the mode setting unit.

19. The imaging apparatus according to claim 18, wherein, in a case where the base image is not selected by the selecting unit, the control unit controls to display the predetermined display item for the multiple-exposure imaging in response to a capturing operation of a first image performed after the mode setting unit setting the mode in the multiple-exposure imaging mode.

20. The imaging apparatus according to claim 18, wherein, the predetermined display item for the multiple-exposure imaging is displayed in the multiple-exposure imaging mode, shutter speed, diaphragm value, exposure correction value, the number of remaining images that can be stored in a recording medium, AF type, size of captured image, luminance histogram, and inclination information detectable using a leveling instrument, are not displayed.

21. A method of controlling an imaging apparatus comprising an imaging unit configured to capture a through image, the method comprising steps of:
displaying a display item together with the thorough image captured by an imaging unit on a display unit;
setting a mode to a multiple-exposure imaging mode; and
controlling a predetermined display item to be displayed together with the thorough image for the multiple-exposure imaging in response to the setting step;
wherein in the controlling step, even if it is set to the multiple-exposure imaging mode, the mode is set to the multiple-exposure imaging mode without displaying the predetermined display item for the multiple-exposure imaging when an image to be multiple-composited with the thorough image has not been acquired, and when an image which is to be multiple-composited with the thorough image has been acquired, the predetermined display item for the multiple-exposure imaging is displayed together with the thorough image.

* * * * *